US012651220B2

(12) United States Patent
Ouyang et al.

(10) Patent No.: US 12,651,220 B2
(45) Date of Patent: \*Jun. 9, 2026

(54) SYSTEMS AND METHODS FOR DETERMINING PATH SOLUTIONS ASSOCIATED WITH A SUPPLY CHAIN NETWORK

(71) Applicant: Coupa Software Incorporated, San Mateo, CA (US)

(72) Inventors: Zheng Ouyang, Ann Arbor, MI (US); Yun Xu, Ann Arbor, MI (US)

(73) Assignee: Coupa Software Incorporated, Foster City, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 18/928,719

(22) Filed: Oct. 28, 2024

(65) Prior Publication Data

US 2025/0053902 A1 Feb. 13, 2025

Related U.S. Application Data

(63) Continuation of application No. 18/446,676, filed on Aug. 9, 2023, now Pat. No. 12,141,729, and a
(Continued)

(51) Int. Cl.
*G06Q 10/0631* (2023.01)
*G06Q 10/04* (2023.01)
(Continued)

(52) U.S. Cl.
CPC ....... *G06Q 10/06315* (2013.01); *G06Q 10/04* (2013.01); *G06Q 10/06* (2013.01); *G06Q 10/08* (2013.01); *G06N 7/01* (2023.01)

(58) Field of Classification Search
CPC .. G06Q 10/06315; G06Q 10/04; G06Q 10/06; G06Q 10/08; G06N 7/01
See application file for complete search history.

(56) References Cited

U.S. PATENT DOCUMENTS 8,214,238 B1 7/2012 Fairfield et al.
8,266,066 B1 9/2012 Wezter et al.
(Continued)

FOREIGN PATENT DOCUMENTS

CN 110991056 A 4/2020
WO 2002077917 A1 10/2002

OTHER PUBLICATIONS

Hsiao-Fan Wang et al., "A Close-Loop Logistic Model With a Spanning-Tree Based Genetic Algorithm," Computers & Operations Research 37, 2010, pp. 376-389, Elsevier Ltd., London, UK.
(Continued)

*Primary Examiner* — Rutao Wu
*Assistant Examiner* — Tyrone E Singletary
(74) *Attorney, Agent, or Firm* — Baker Botts L.L.P.

(57) ABSTRACT

Input data comprises an order to provide a quantity of one or more finished goods to a site. Software is programmed for: accessing information that defines an architecture of a supply chain network comprising a plurality of sites connected by a plurality of path fragments; generating one or more path solutions to fulfill the order; removing one or more loops from the one or more path solutions; generating based on the one or more path solutions and the one or more removed loops, one or more revised path solutions; outputting the one or more revised path solutions for display on a client device; and transmitting, only to computers of the sites of a revised subset of a plurality of path fragments, a plurality of signals to initiate movement of one or more of raw materials or finished goods.

25 Claims, 11 Drawing Sheets

Related U.S. Application Data continuation of application No. 17/219,628, filed on Mar. 31, 2021, now Pat. No. 11,769,093.

(51) Int. Cl.
| | |
|---|---|
| *G06Q 10/06* | (2023.01) |
| *G06Q 10/08* | (2023.01) |
| *G06N 7/01* | (2023.01) |

(56) References Cited

U.S. PATENT DOCUMENTS

| | | | | |
|---|---|---|---|---|
| 2001/0032029 | A1 | 10/2001 | Kauffman | |
| 2002/0156663 | A1 | 10/2002 | Weber | |
| 2005/0171827 | A1* | 8/2005 | Denton | G06Q 10/06312 |
| | | | | 705/7.29 |
| 2006/0282346 | A1 | 12/2006 | Kernodle et al. | |
| 2008/0015721 | A1 | 1/2008 | Spearman | |
| 2009/0150208 | A1 | 6/2009 | Rhodes et al. | |
| 2009/0319070 | A1 | 12/2009 | Morningred et al. | |
| 2009/0327027 | A1 | 12/2009 | Bateni et al. | |
| 2011/0098834 | A1 | 4/2011 | Couronne et al. | |
| 2011/0130857 | A1 | 6/2011 | Budiman | |
| 2011/0173042 | A1 | 7/2011 | Riepshoff | |
| 2011/0282476 | A1 | 11/2011 | Hegemier et al. | |
| 2012/0072431 | A1 | 3/2012 | Berlener et al. | |
| 2012/0253865 | A1 | 10/2012 | Narasimhamurt | |
| 2015/0039375 | A1 | 2/2015 | Grich | |
| 2015/0100365 | A1 | 4/2015 | Torkian et al. | |
| 2015/0120373 | A1 | 4/2015 | Bajaj et al. | |
| 2019/0073611 | A1* | 3/2019 | Sahota | G06Q 10/08 |
| 2019/0188621 | A1 | 6/2019 | Nasu | |
| 2021/0049532 | A1 | 2/2021 | Smith | |
| 2021/0091957 | A1 | 3/2021 | Ford | |
| 2021/0158259 | A1 | 5/2021 | Evans et al. | |
| 2021/0256443 | A1* | 8/2021 | Srivastava | G06Q 10/067 |
| 2022/0156693 | A1* | 5/2022 | Singh | G06Q 30/0205 |

OTHER PUBLICATIONS

N. Viswanadham, R. Gaonkar and V. Subramaniain, "Optimal configuration and partner selection in dynamic manufacturing networks," Proceedings 2001 ICRA. IEEE International Conference on Robotics and Automation (Cat. No. 01CH37164), Seoul, Korea (South), 2001, pp. 854-859 vol. 1 (Year: 2001).

Eskandarpour, Majid, Pierre Dejax, and Olivier Peton. "A large neighborhood search heuristic for supply chain network," Ecole des Iviines de Nantes, Techmcai report AUTO/14.3 (2014).

Barbaro, R.W et al. "Generalized Multiperiod MIP Model for Production Scheduling and Processing Facilities Selection and Location," "Technical Papers," Mining Engineering, SME preprint 83-123, SME-AIME Annual Meeting, Atlanta, GA, Mar. 1983. Manuscript Jan. 1983. Feb. 1986, pp. 107-114 (8 Pgs).

Maravelias, Christopher T., "Mixed Integer Programming Methods for Supply Chain Optimization," Chemical and Biological Engineering, University of Wisconsin, Madison, WI 53706, USA, for "PASI 2011," Jul. 19-29, 2011, Angra dos Reis, RJ, Brazil, 187 pages.

Georgiadis, Georgios p et al., "Optimization-Based Scheduling for the Process Industries: From Theory to Real- Life Industrial Applications," "Processes 2019," 7,438; doi: 10,3390/pr7070438, vfl.vw. mdpi.com/ioumal/processes, Accepted: Jul. 4, 2019; and Published Jul. 10, 2019, pp. 1-35.

Braz, Antonio Carlos, "The bullwhip effect in closed-loop supply chains: A systemic literature review," Aug. 6, 2019, Journal of Cleaner Production (Year: 2019).

U.S. Appl. No. 18/446,676, filed Aug. 9, 2023.

U.S. Appl. No. 17/219,628, filed Mar. 31, 2021.

\* cited by examiner

```
begin
    integer list array A_k(n), B(n); logical array blocked (n); integer s;
    logical procedure CIRCUIT (integer value v);
        begin logical f;
            procedure UNBLOCK (integer value u);
                begin
                    blocked(u) : = false;
                    for * -B(u) do
                        begin
                            delete w from B(u);
                            if blocked(w) then UNBLOCK(w);
                        end
                end UNBLOCK;
            f : = false;
            stack v;
            blocked(v) : = true;
L1:         for * -'_k(v) do
                if w = s then
                    begin
                        output circuit composed of stack followed by s;
                        f : = true;
                    end
                else if ¬ blocked(w) then
                        if CIRCUIT(w) then f : = true;
L2:         if f then UNBLOCK(v)
            else for * -'_k(v)do
                    if ) -B(w) then put v on B(w);
            unstack v;
            CIRCUIT : = f;
        end CIRCUIT;
    empty stack;
    s : = 1 ;
    while s < n do
        begin
            A_k : = adjacency structure of strong component K with lease vertex in subgraph of G induced by
                    {s, s+1,,,,#n};
            if A_k + .  then
                begin
                    s : = least vertex in V_k :
                    for (-V_k do
                        begin
                            blocked(i) := false;
                            B(i" $&. %
                        end;
L3:                 dummy : = CIRCUIT(s) :
                    s : = s+1;
                end
            else s : = n ;
        end
end;
```

FIG. 6

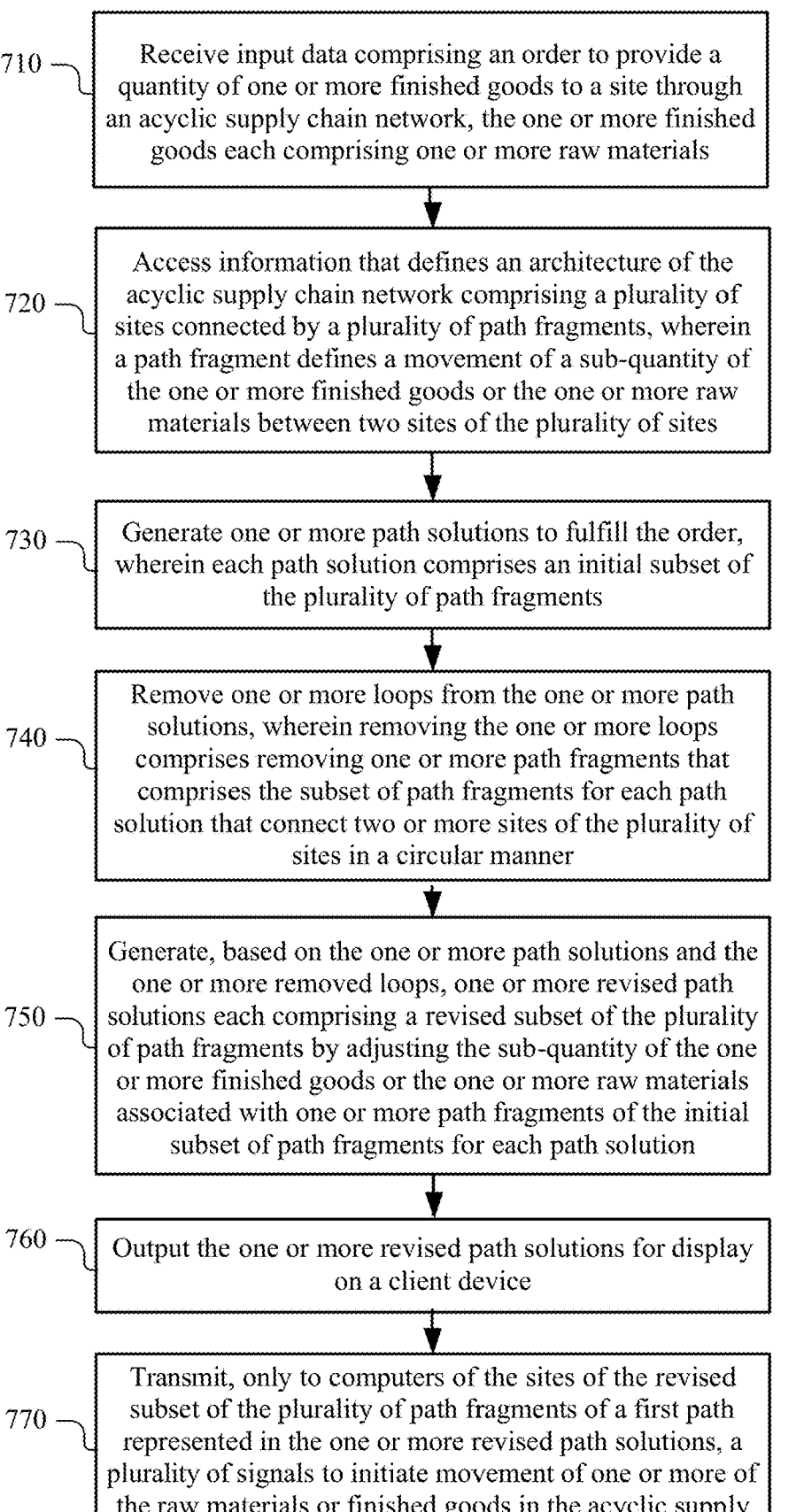

700

710 — Receive input data comprising an order to provide a quantity of one or more finished goods to a site through an acyclic supply chain network, the one or more finished goods each comprising one or more raw materials 720 — Access information that defines an architecture of the acyclic supply chain network comprising a plurality of sites connected by a plurality of path fragments, wherein a path fragment defines a movement of a sub-quantity of the one or more finished goods or the one or more raw materials between two sites of the plurality of sites 730 — Generate one or more path solutions to fulfill the order, wherein each path solution comprises an initial subset of the plurality of path fragments 740 — Remove one or more loops from the one or more path solutions, wherein removing the one or more loops comprises removing one or more path fragments that comprises the subset of path fragments for each path solution that connect two or more sites of the plurality of sites in a circular manner 750 — Generate, based on the one or more path solutions and the one or more removed loops, one or more revised path solutions each comprising a revised subset of the plurality of path fragments by adjusting the sub-quantity of the one or more finished goods or the one or more raw materials associated with one or more path fragments of the initial subset of path fragments for each path solution 760 — Output the one or more revised path solutions for display on a client device 770 — Transmit, only to computers of the sites of the revised subset of the plurality of path fragments of a first path represented in the one or more revised path solutions, a plurality of signals to initiate movement of one or more of the raw materials or finished goods in the acyclic supply chain network along the first path

FIG. 7

SYSTEMS AND METHODS FOR DETERMINING PATH SOLUTIONS ASSOCIATED WITH A SUPPLY CHAIN NETWORK

BENEFIT CLAIM

This application claims the benefit under 35 U.S.C. § 120 as a continuation of application Ser. No. 18/446,676, filed Aug. 9, 2023, which is a continuation of application Ser. No. 17/219,628, filed Mar. 31, 2021, now U.S. Pat. No. 11,769, 093, the entire contents of which are hereby incorporated by reference as if fully set forth herein. The applicant hereby rescinds any disclaimer of claim scope in the application(s) of which the benefit is claimed and advises the USPTO that the present claims may be broader than any application(s) of which the benefit is claimed.

TECHNICAL FIELD

One technical field of the present disclosure is computer-implemented spend management systems and e-procurement systems offered as software as a service (Saas). Another technical field of the present disclosure is computer-implemented algorithms for supply chain management, including determining optimal path solutions associated with supply chain networks.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Supply chain networks or other modeling techniques are often used to analyze and optimize shipping and production by predicting the best combinations of sites, for example, distribution centers, suppliers, vendors, and manufacturers, to utilize to meet consumer demand for a particular finished good. Supply chain networks may be cyclic or acyclic and comprise a variety of architectures, and may include, for example, one or more loops or sub-networks. Supply chain network techniques often employ multiple levels of interdependence and connectivity between sites within the supply chain network. Multiple models or techniques are utilized to predict the behavior and interactions between these sites to optimally deliver goods and services to various points or locations along the supply chain network. Moreover, network path searching is essential to assess the efficiency and functionality of a supply chain network.

Fulfilling these requirements with a human-based solution has become impractical, so users are searching for automated means of managing millions of data items while still supporting real-time response. Computer-based techniques that could determine and output the best path through complex supply chain networks, with a real-time response as real-world conditions affecting distribution centers, suppliers, vendors, and manufacturers change, based on large-scale datasets describing the networks and conditions, would provide a practical application that would gain widespread use in industry.

SUMMARY

The appended claims may serve as a summary of the invention.

BRIEF DESCRIPTION OF THE DRAWINGS

In the drawings:

FIG. 6 illustrates an example pseudocode for an algorithm to detect one or more circuits in a supply chain network.

FIG. 7 illustrates an example method to generate one or more path solutions to fulfill an order for a quantity of finished goods through a supply chain network.

DETAILED DESCRIPTION

Figure 1A:
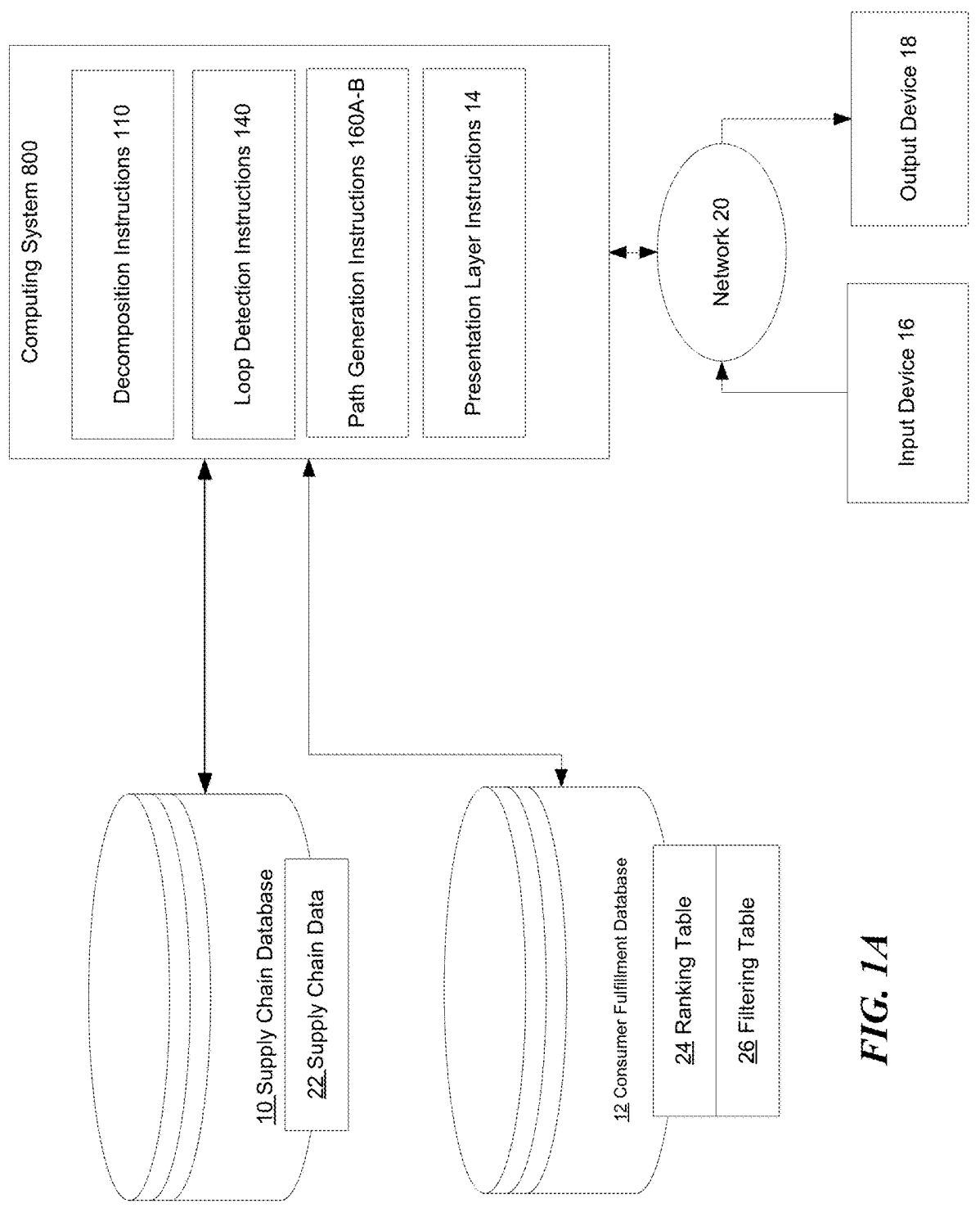
FIG. 1A illustrates an example distributed computer system with which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in the sections below according to the following outline:

1. General Overview
2. Structural & Functional Overview
3. Implementation Example—Hardware Overview
4. Extension and Alternatives 1. General Overview Embodiments provide computer-implemented methods and stored-program computer systems capable of calculating revenue, costs, and other criteria associated with commodities moving in complex supply chains having multiple different possible paths and path fragments. Embodiments may be programmed to calculate a plurality of path solutions from starting points to ending points of complex supply chains and to dynamically calculate and/or update the costs of transferring commodities from one point in a complex chain to another point in the complex chain. User input or programmatic input may specify an arbitrary starting point of a commodity in the complex supply chain and an arbitrary ending point, and the methods and systems are programmed to automatically calculate end-to-end costs, taking into account duties, taxes, and other costs imposed by points in the chain.

In one embodiment, a computer-implemented method, comprises receiving input data comprising an order to provide a quantity of one or more finished goods to a site through an acyclic supply chain network, the one or more finished goods each comprising one or more raw materials; accessing information that defines an architecture of the acyclic supply chain network comprising a plurality of sites connected by a plurality of path fragments, wherein a path fragment defines a movement of a sub-quantity of the one or more finished goods or the one or more raw materials between two sites of the plurality of sites; generating one or more path solutions to fulfill the order, wherein each path solution comprises an initial subset of the plurality of path fragments; removing one or more loops from the one or more path solutions, wherein removing the one or more loops comprises removing one or more path fragments that comprises the subset of path fragments for each path solution that connect two or more sites of the plurality of sites in a circular manner; generating, based on the one or more path solutions and the one or more removed loops, one or more revised path solutions each comprising a revised subset of the plurality of path fragments by adjusting the sub-quantity of the one or more finished goods or the one or more raw materials associated with one or more path fragments of the initial subset of path fragments for each path solution; outputting the one or more revised path solutions for display on a client device; and transmitting, only to computers of the sites of the revised subset of the plurality of path fragments of a first path represented in the one or more revised path solutions, a plurality of signals to initiate movement of one or more of the raw materials or finished goods in the acyclic supply chain network along the first path.

2. Structural & Functional Overview

In the following description, the following terms have the following meanings.

As used herein, "finished good" or "FG," as used in accordance with the present disclosure, refers to any product or its derivatives that has completed the manufacturing process and is ready to be sold, offered for sale, or otherwise distributed to the general public. A finished good may have a bill of materials ("BOM"), which describes the composition of a finished good. A finished good may be composed of one or more raw materials, one or more other finished goods, or any combination of the aforementioned. For example, a finished good may be a candle, which comprises wax (a raw material), a wick (a raw material), and a glass jar (a finished material, comprising sand (a raw material), soda ash (a raw material), and limestone (a raw material)).

As used herein, "raw material" or "RM," as used in accordance with the present disclosure, refers to any unprocessed or unmanufactured material or a minimally processed or minimally manufactured material used to create a finished good. One or more raw materials may be used to manufacture a finished good. For example, a raw material may include latex, water, sand, soda ash, cotton, iron, silver, clay, or similar.

As used herein, "Customer Zone" or "CZ," as used in accordance with the present disclosure, refers to the location of demand in the network path; it may be any port of entry, free trade zone, customs zone, or other destination at which customs duties are assessed or charged for goods or commodities, and/or any entity associated with such a destination, such as a customs broker. A CZ may receive one or more finished goods from one or more distribution centers. Further, a CZ can represent an individual location or a group of locations in proximity. For example, CZs may represent sites in a supply chain network for a particular state or postal code region. One or more CZs may represent sites in a supply chain network for a particular finished good or a group of finished goods.

As used herein, "distribution center" or "DC," as used in accordance with the present disclosure, refers to any location, business, or other entity where one or more finished goods are stocked, stored, and managed prior to shipping finished goods to the one or more CZs (e.g., a warehouse). A distribution center may receive one or more finished goods from one or more manufacturers. For example, a distribution center may receive a candle. One or more distribution centers may represent sites in a supply chain network for a particular finished good or a group of finished goods.

As used herein, "manufacturer" or "MFG," as used in accordance with the present disclosure, refers to any location, business, or other facility where one or more raw materials ("RM") and/or one or more finished goods are received and used to produce or manufacture one or more finished goods. A manufacturer may receive one or more raw materials or one or more finished goods from suppliers, vendors, or other manufacturers. For example, a manufacturer may receive wax (a raw material), a wick (a raw material), and a glass jar (a finished good) to manufacture and produce a candle. One or more manufacturers may represent sites in a supply chain network for a particular finished good or a group of finished goods.

As used herein, "supplier," as used in accordance with the present disclosure, refers to any location, business, or other entity that provides goods or services to a manufacturer. A supplier may receive one or more raw materials from one or more vendors, other suppliers, or from one or more manufacturers and send them to one or more manufacturers or suppliers. One or more suppliers may represent sites in a supply chain network for a particular finished good or a group of finished goods.

As used herein, "vendor," as used in accordance with the present disclosure, refers to any location, business, or other entity that makes or procures raw materials for sale. One or more vendors may represent sites in a supply chain network for a particular finished good or a group of finished goods.

Corporations today often employ supply chain networks or other modeling techniques to analyze and optimize their supply chains by predicting the best combinations of suppliers and manufacturers that should be utilized to meet consumer demand. Supply chain networks may include one or more sites, customer zones, and finished goods, with each finished good being associated with a bill of materials that includes one or more raw materials. Each added component increases the complexity of a supply chain network, resulting in hundreds or thousands of potential path solutions to fulfill an order for a quantity of finished goods. Existing supply chain network techniques often employ multiple models that exclude certain financial considerations or fail to consider how different stages of the supply chain (e.g., supplier to manufacturer, manufacturer to distributor, etc.) interact with one another. This is a difficult process, especially for large supply chain networks, with the number of path solutions growing exponentially with the number of sites and finished products involved. Moreover, inefficient decisions made at one junction along a supply chain may compound and create greater inefficiencies at other points along the chain. This may result in supply chain network outputs that are costly or even unfeasible.

The speed of business and the movement of goods throughout the world today also require a real-time or near-instantaneous response to ever-changing demand. Yet, the complexities of these models often require substantial computing power and resources to operate. For example, corporations may have dozens of distribution centers, manufacturers, and raw materials suppliers that may be used to produce several finished goods, each finished good comprising several raw materials. The resulting supply chain may require thousands to millions of iterations to generate an optimal supply path fragment. To efficiently generate an optimal path solution, advanced processing equipment, large storage capacity, memory, and power may be required to quickly process and produce an optimal path fragment along the supply chain. Additionally, consumers may require customizable and detailed constraints unique to the supply chain network (e.g., shipping costs, material costs, or another variable specific to a consumer) to provide a feasible and accurate solution that is tailored to the individual consumer. This customized detail enables the optimization of complex components of the supply chain, such as a manufacturer that receives a vast array of raw materials and produces a plethora of different types of finished goods.

Additional complexities may arise when optimizing a supply chain network for multiple time periods. For example, when determining possible or optimal path solutions for a specific time period (e.g., a week or a month), consumers may further provide information regarding starting inventories (e.g., a known quantity of finished goods or raw materials at the start of the time period), a required ending inventory, and cross-period flows (e.g., a particular path fragment defining a movement of finished goods or raw materials that begins during one time period and ends during another, for example, a shipment of raw materials that takes longer than a week to ship from one site to another). Loops in the supply chain network, path or path fragment constraints, and incomplete data describing the supply chain network may further increase the complexity of determining possible or optimal path solutions.

Embodiments disclosed herein provide optimal path solutions to fulfill an order for a quantity of one or more finished goods through a supply chain network using real-time or near real-time solutions. These techniques allow for solutions for finished goods and raw materials flow and sourcing optimization problems associated with one or more metrics of a supply chain network. In an embodiment, a computing system is programmed to receive input data comprising an order to provide a quantity of one or more finished goods to a site through an acyclic supply chain network, the one or more finished goods each comprising one or more raw materials. The computing system is programmed to access information that defines an architecture of the acyclic supply chain network comprising a plurality of sites (e.g., a CZ or distribution center). The sites may be connected by a plurality of path fragments defining a movement of a subquantity of the one or more finished goods or the one or more raw materials between the two sites. Using this data, the computing system is programmed to generate one or more path solutions along the supply chain network to fulfill the order that indicates the sites where particular quantities of goods should be manufactured, as well as sites where particular quantities of raw materials should be purchased from in order to obtain an optimal result for the consumer. The optimal result may include, for example, one or more path solutions along the supply chain network that optimize one or more metrics of a supply chain network, for example, reducing the cost or time associated with fulfillment. In some embodiments, a heuristic method may be used to select high-priority paths to handle the exponential growth of paths in a complex supply chain network. In particular embodiments, the computing system may transmit signals to computing devices associated with one or more sites in the supply chain network to rapidly initiate the fulfillment of an order of finished goods or raw materials. In this manner, a consumer can quickly and efficiently fulfill multiple orders with a supply chain network in an optimal or near-optimal fashion while meeting the needs of their customers with real-time responses to changing market conditions.

Embodiments disclosed herein further provide product and site relationship analysis in a large supply chain network. For example, complex manufacturing sites may manufacture several different types of finished goods using a diverse inventory of raw materials. Particular embodiments may provide product relationship analysis for a supply chain network or for one or more sites within the network. This analysis provides additional output for the consumer, including, for example, a criticality evaluation that may evaluate the importance of one or more sites, path fragments, or raw materials comprising a particular path solution. Embodiments disclosed herein also provide constraints and criteria to customize path solutions or outputs. For example, consumers may desire path solutions at the lowest cost, fastest time, or highest revenue. As another example, the consumer may seek to tailor the path solutions to the current conditions, for example, maximizing raw materials purchased from a preferred supplier or not using a particular manufacturing site due to an embargo or worker's strike. Embodiments herein permit the consumer to provide constraints to avoid infeasible or impractical solutions, as well as customize the output based on the particular needs of the consumer. The outputs of the methods disclosed herein further permit consumers to stay agile in uncertain business climates and reduce siloed decision-making.

The disclosed embodiments provide numerous advantages to supply chain monitoring and optimization systems. The path solutions allow a consumer to better understand and control inefficiencies and costs related to particular finished goods, raw materials, and sites in the supply chain network, improve pricing decisions, and control costs throughout the supply chain network. Outputs may further permit the user to better understand sourcing options to fulfill a particular order for one or more finished goods, provide for more efficient SKU rationalization, and provide better information for understanding how a newly introduced finished good, site, raw material, or supplier impacts the overall supply chain network.

FIG. 1A illustrates an example distributed computer system with which an embodiment may be implemented. In the example of FIG. 1A, a computing system 800 is communicatively coupled to a supply chain database 10, consumer fulfillment database 12, and network 20. Computing system 800 may have the structure of FIG. 8 or may comprise one or more computers, servers, and/or virtual machine instances in any of the public and private data centers and/or cloud computing facilities. In one embodiment, computing system 800 is a virtual machine instance of a multi-tenant, SaaS-based spend management system or interoperates with such a system.

Supply chain database 10 may comprise a relational database system, flat file system, object database, or other repository that is programmed to store structured data in one or more tables or other data structures. In one embodiment, supply chain database 10 stores supply chain data or architecture 22 as further described herein in relation to FIG. 2.

Consumer fulfillment database 12 may comprise a relational database system, flat file system, object database, or other repository that is programmed to store structured data in one or more tables or other data structures. In one embodiment, the consumer fulfillment database 12 stores ranking table 24 and filtering table 26 as further described herein in relation to FIG. 1B.

In one embodiment, computing system 800 is programmed to execute decomposition instructions 110, loop detection instructions 140, path generation instructions at step 160A-B, and presentation layer instructions 14. For example, decomposition instructions 110 may be programmed to correspond to the algorithm or method 100 of FIG. 1B, and FIG. 3. Loop detection instructions 140 may be programmed to correspond to the method and algorithm of FIG. 1B, FIG. 4A, FIG. 4B, FIG. 5A, and FIG. 5B. Path generation instructions 160 A-B may be programmed to correspond to the method of FIG. 1B and FIG. 7. Presentation layer instructions 14 are programmed to receive digital data input from one or more input devices 16 and to format output data for transmission to output device 18 for rendering at the output device. For example, presentation layer instructions 14 may be programmed to generate dynamic HTML for presentation as web pages at output device 18 as part of delivering execution of instructions corresponding to method 100 and method 700 as SaaS.

Computing system 800 also may comprise non-volatile storage and/or volatile memory for use in storing working copies of the tables and other data structures that are further described herein in relation to FIG. 2, FIG. 3, FIG. 4A, FIG. 4B, FIG. 5A, FIG. 5B, FIG. 6. Thus, each of FIG. 2, FIG. 3, FIG. 4A, FIG. 4B, FIG. 5A, FIG. 5B, FIG. 6 graphically illustrates electronic data that is digitally stored at least transiently during access, calculations, transformation, and output in one or more of volatile or non-volatile digital computer memory.

Input device 16 and output device 18 may be associated with a user account that is maintained in computing system 800 or other elements of a SaaS spend management system and accessed using dynamically generated web pages via network 20. The network 20 broadly represents one or more local area networks, wide area networks, internetworks, or a combination thereof using any of terrestrial or satellite, wired, or wireless network links.

Figure 1B:
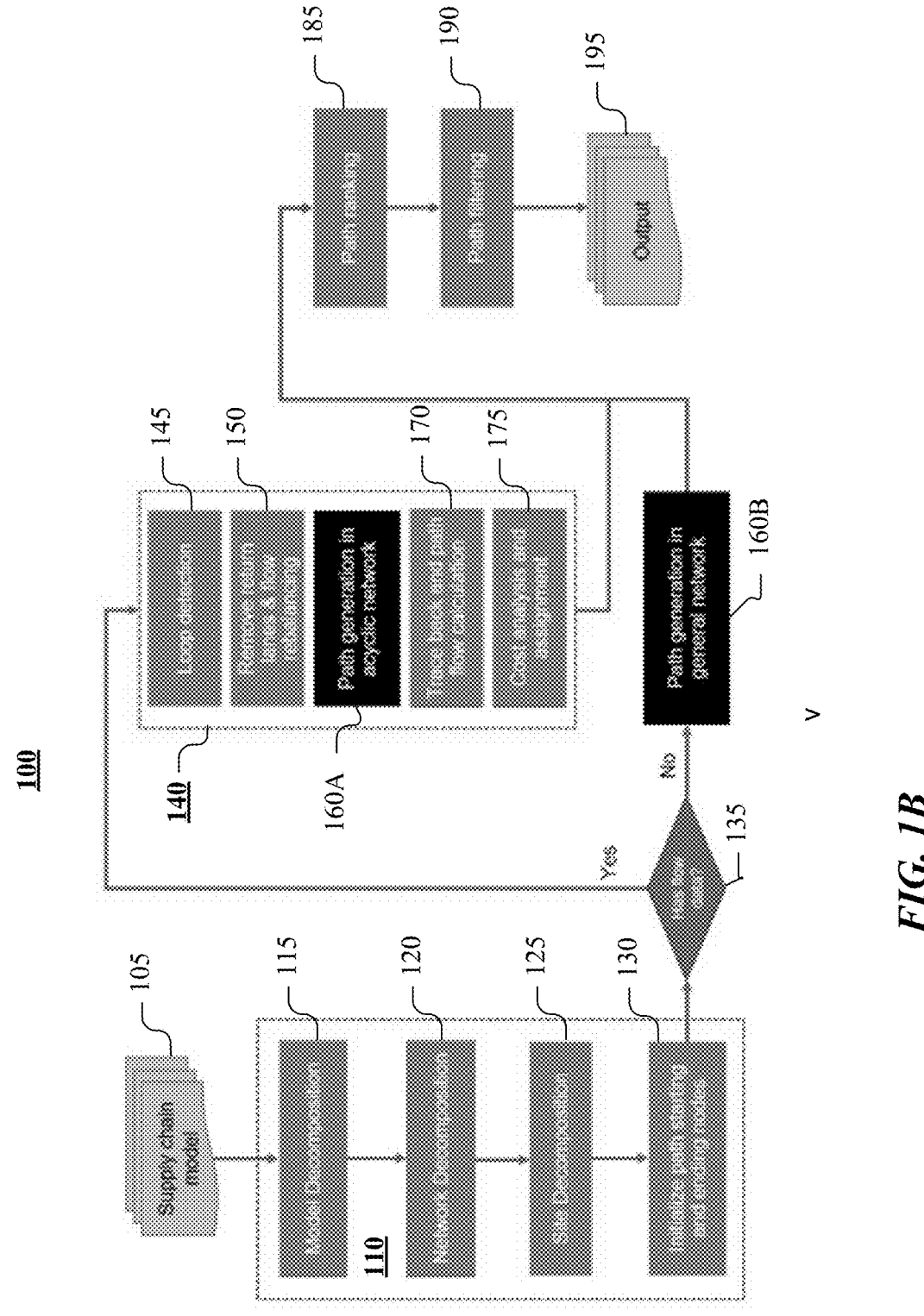
FIG. 1B illustrates an example computer-implemented method for generating one or more path solutions.

FIG. 1B illustrates an example computer-implemented method for generating one or more path solutions.

In the example of FIG. 1B, a method 100 begins execution at step 105, at which a computing system may receive input data comprising an order for the fulfillment of one or more finished goods (including a BOM for each finished good) at one or more locations through a supply chain network. The input data may further comprise one or more conditions or information that defines the architecture of a supply chain network used to fulfill the order, flow data comprising one or more path fragments defining a movement of finished goods or raw materials between two sites in the supply chain network along with a list of predetermined criteria to optimally complete the order (e.g., at the lowest cost, quickest speed, etc.).

Using this information, the computing system is programmed to execute decomposition instructions 110 to decompose the model of the supply chain network. Decomposition instructions 110 may comprise one or more steps as illustrated in FIG. 1B, for example, model decomposition 115, supply chain network composition 120, and site decomposition 125, which may decompose the model using, for example, one or more commonalities in received input at step 105 such as commonalities between one or more finished goods in the order, raw materials, or site characteristics. At step 130, the computing system is programmed to execute the decomposition instructions 110 by initializing one or more path starting and ending nodes at step 130 in the supply chain that may be used to generate one or more path solutions to fulfill the order. At step 135, the computing system may determine whether the input received at step 105 comprises flow data for the supply chain network, for example, one or more path fragments defining a movement of a quantity of finished goods or raw materials between two sites in the supply chain network. If the computing system determines at step 135 that flow data exists in the received input data at step 105, the computing system is programmed to execute loop detection instructions 140 to detect and remove one or more loops in the supply chain network based on a circular movement of finished goods or raw materials between two or more sites in the network. Loop detection instructions 140 may comprise one or more steps, as illustrated in FIG. 1B, for example, loop detection 145, removing return lanes and flow rebalancing 150, path generation in an acyclic network at step 160A, trace back and path flow calculations 170, and cost analysis and assignment 175. Alternatively, if the computing system determines at step 135 that no flow data exists for the supply chain network, the computing system is programmed to enumerate one or more path solutions in a general network at step 160B, comprising one or more path fragments along with associated sub-quantities of finished goods and/or raw materials in the supply chain network that can be utilized to fulfill the order.

At step 185, the computing system is programmed to rank the path solutions based on the criteria provided. At step 190, the computing system is programmed to filter the path solutions based on the criteria provided. Using these rankings, the computing system is programmed to generate an output 195 comprising one or more optimal path solutions that describe an optimal way to fulfill the order using the supply chain network.

Particular embodiments may repeat one or more steps of the method of FIG. 1B, where appropriate. Although this disclosure describes and illustrates particular steps of the method of FIG. 1B as occurring in a particular order, this disclosure contemplates any suitable steps of the method of FIG. 1B occurring in any suitable order. Moreover, although this disclosure describes and illustrates an example method for generating one or more path solutions, including the particular steps of the method of FIG. 1B, this disclosure contemplates any suitable method for generating one or more path solutions, including any suitable steps, which may include all, some, or none of the steps of the method of FIG. 1B, where appropriate. Furthermore, although this disclosure describes and illustrates particular components, devices, or systems carrying out particular steps of the method of FIG. 1B, this disclosure contemplates any suitable combination of any suitable components, devices, or systems carrying out any suitable steps of the method of FIG. 1B.

Figure 2:
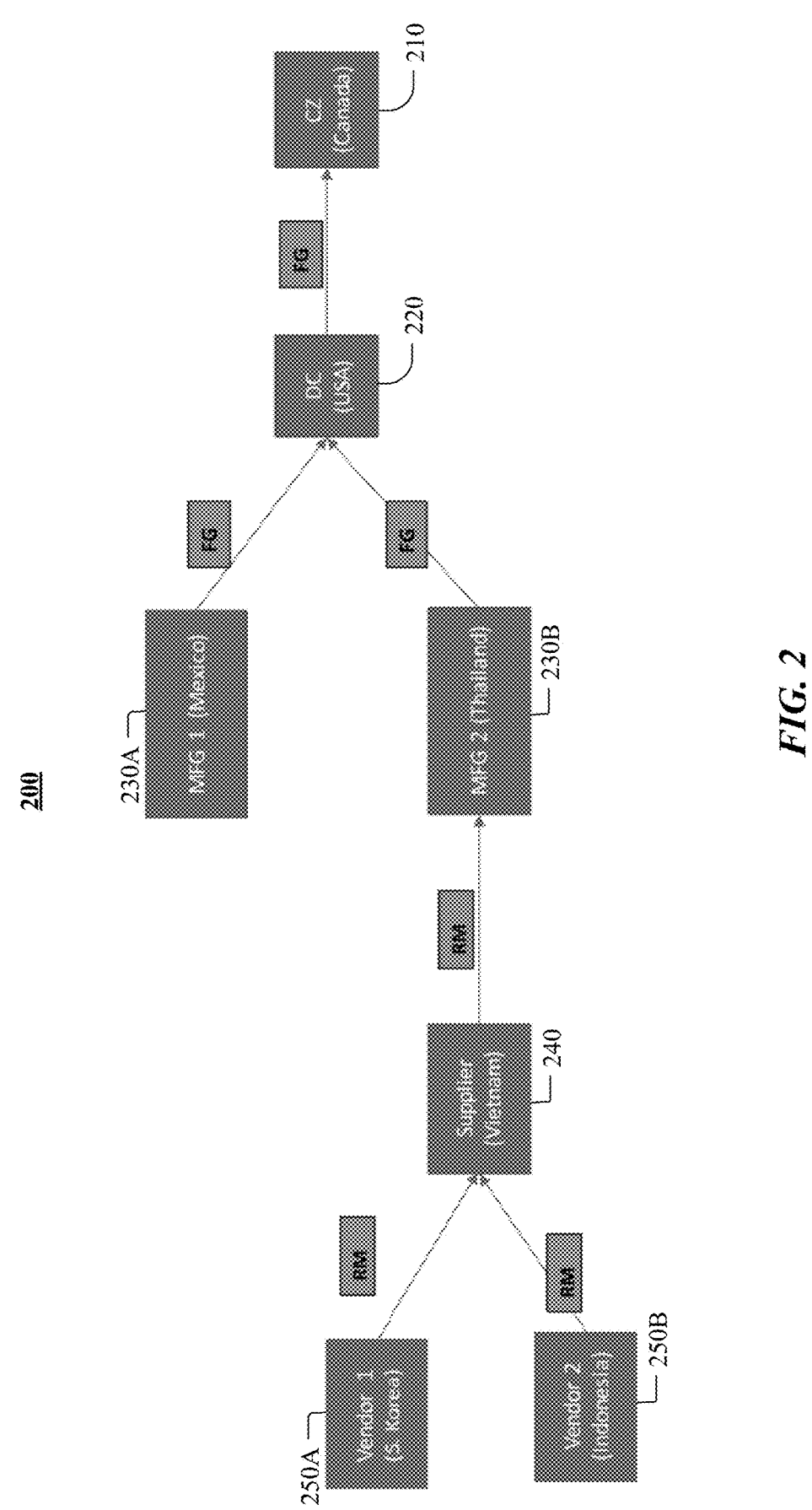
FIG. 2 illustrates an example supply chain network.

FIG. 2 illustrates an example supply chain network. Supply chain network ("SCN") 200 may comprise one or more sites that contribute to the production and distribution of a finished good. In particular embodiments, a consumer of the optimization model may be affiliated or associated with one or more sites of the SCN (e.g., owning, leasing, contracting, or otherwise having a business relationship with each site). Different sites in the supply chain may be connected by one or more path fragments, which connect and represent the movement of raw materials, finished goods, or similar commodities between two or more sites in the SCN. As an example, and not by way of limitation, a path fragment may represent a particular site shipping (via air, boat, train, or any other reasonable means) one or more raw materials or finished goods to another site in the SCN.

SCN 200 may comprise several sites. As illustrated in FIG. 2, SCN 200 may comprise "Customer Zone" ("CZ") 210, which may be one or more locations where finished goods ("FG") are sold. CZ 210 may receive one or more finished goods from one or more distribution centers ("DC") 220. A DC 220 may be a location, business, or other entity where one or more finished goods are stocked, stored, and managed prior to shipping finished goods to the one or more CZs (e.g., a warehouse). DC 220 may receive one or more finished goods from one or more manufacturing facilities ("MFG") 230A-B. MFG 230A-B may be a location, business, or other entity where one or more raw materials ("RM") are received and used to produce or manufacture one or more finished goods. One or more MFGs may receive raw materials from one or more suppliers 240. Supplier 240 may be a location, business, or other entity that provides goods or services to an MFG.

One or more suppliers 240 may receive one or more raw materials from one or more vendors 250A-B. A vendor may be a location, business, or other entity that makes or procures raw materials for sale. Each component of the supply chain may be associated with a location, for example, and not by way of limitation a country (e.g., Thailand) or a region (e.g., Southeast Asia). Although FIG. 2 depicts an SCN 200 with all the components described herein, it should be appreciated that an SCN can comprise any combination of the components described herein and in FIG. 2, for example, and not by way of limitation, multiple MFGs 230, suppliers 240, and vendors 250.

In particular embodiments, the computing system may receive input data at step 105, comprising an order for the fulfillment of one or more finished goods (including a BOM for each finished good) at one or more locations. The input may further comprise one or more conditions or information that defines the architecture of a supply chain network used to fulfill the order, flow data comprising one or more path fragments defining a movement of finished goods or raw materials between two sites in the supply chain network, along with a list of predetermined criteria to optimally complete the order (e.g., at the lowest cost, quickest speed, etc.). In particular embodiments, the input data at step 105 may comprise a duty table used to determine taxes and duties associated with particular path fragments comprising a path solution along a supply chain network, information unique to individual sites comprising the SCN, including, for example, and not by way of limitation the type of site in the SCN (e.g., CZ, DZ, MFG, etc.), tax region (e.g., a country or region where each site is located), the types of finished products (including their bill of materials), and/or raw materials sent or received from a particular site, available transportation types available between two or more sites (e.g., air, sea, etc.), average shipping times of finished products or raw materials between two or more sites, information about costs and times to produce or manufacture finished goods or raw materials at a particular site, or other defined filters or criteria that describe specific conditions or costs associated with a particular site. Received input data may further comprise one or more conditions, limitations, descriptions, or data to describe the architecture of a supply chain network used to fulfill the order, data comprising the composition of one or more finished goods (e.g., a BOM), along with a list of one or more predetermined criteria with which the computing system may filter or rank the one or more path solutions generated that fulfill the order (e.g., at the lowest cost, quickest speed, highest revenue, etc.). In particular embodiments, the computing system may further access information that defines an architecture of the supply chain network, comprising a plurality of sites connected by a plurality of path fragments. In particular embodiments, the information that defines the architecture of a supply chain network may be included with the input data, or it may be stored on a computing device associated with the consumer and accessed in real-time by the computing system.

In particular embodiments, the computing system is programmed to execute decomposition instructions 110 to decompose the SCN into one or more sub-networks in order to more efficiently provide an optimal solution for a particular input. Decomposing the original SCN into one or more sub-networks prior to enumerating one or more path solutions may greatly reduce the memory usage by the computing system during operation, decrease the runtime required to produce one or more optimal path solutions, and also make it possible to enumerate path solutions through parallel computing. Decomposition instructions may comprise one or more of model decomposition 115, network decomposition 120, site decomposition 125, and initialize path starting and ending nodes at step 130.

Figure 3:
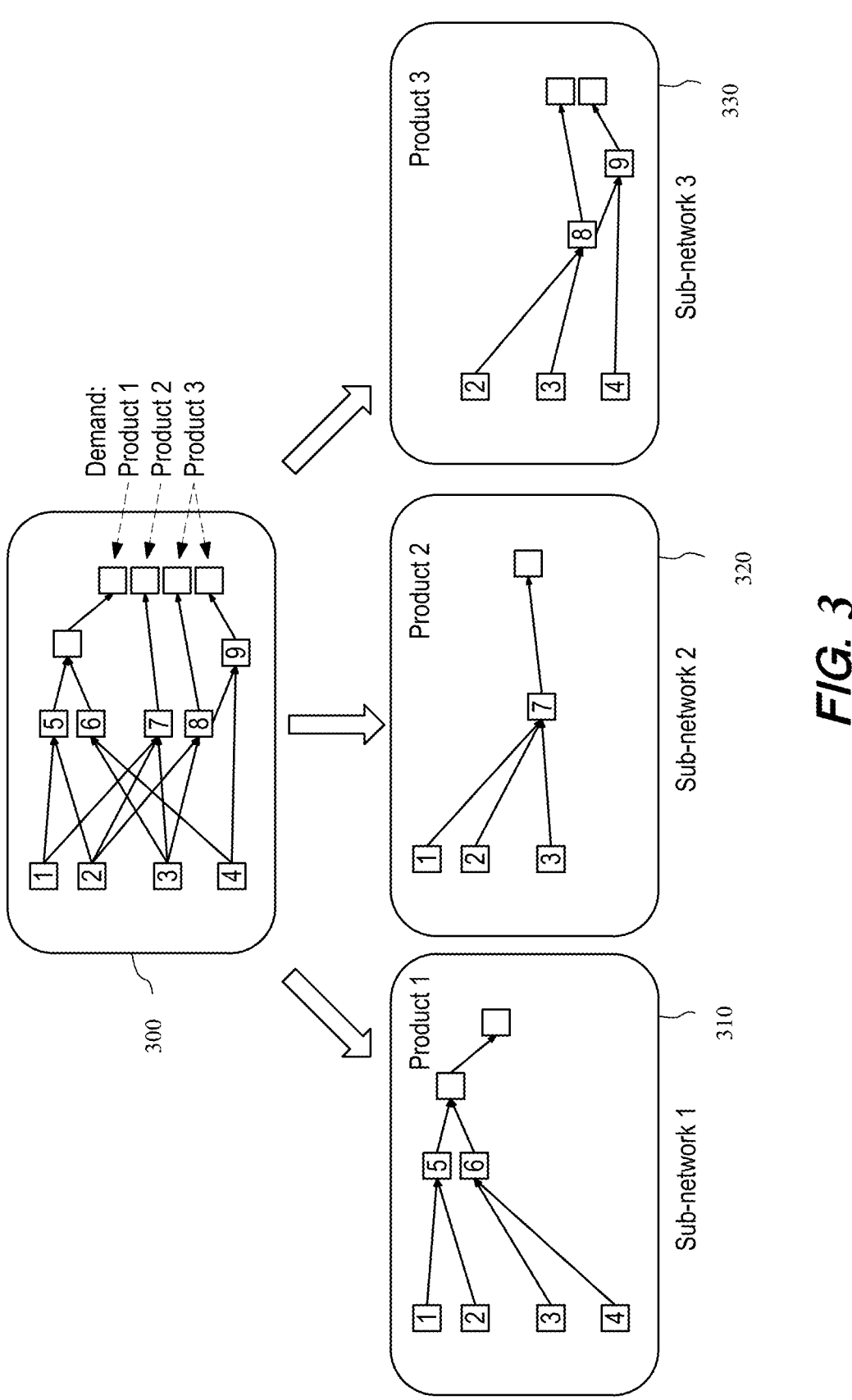
FIG. 3 illustrates a model decomposition of a supply chain network into one or more sub-networks.

FIG. 3 illustrates a model decomposition of a supply chain network into one or more sub-networks. As illustrated in FIG. 3, the computing system may receive an input describing a particular SCN 300 that may be used to fulfill an order for four finished goods at four different sites. To decompose SCN 300 for this particular input, the computing system may first construct a product network based on one or more relationships between the one or more finished goods, for example, using a bill of materials relational analysis (BOM) for each finished good, which defines the composition of each finished good. For example, if finished good X and finished good Y share a common raw material Z in the BOM, finished good X and finished good Y may be considered as sharing a BOM connection. In particular embodiments, the computing system may be programmed to decompose the model by extracting and generating one or more clusters of finished goods into sub-networks based on their raw material connections. A raw material connection may be defined or based on a common raw material shared between two or more of the finished goods. As illustrated in FIG. 3, no finished goods share a BOM connection, so the computing system may generate a separate sub-network 310-330 for each of the one or more clusters of finished goods.

In particular embodiments, the computing system may further decompose the SCN by analyzing the one or more sub-networks by, for example, generating a sub-network that is individualized and associated with a particular site in the SCN 300 (e.g., sub-networks that describe the movement of raw materials or finished goods within a particular site). For example, a particular site may receive multiple types of raw materials and manufacture multiple different types of finished goods, and in particular embodiments, a manufacturing site may further combine one or more finished goods or raw materials to produce a different finished good.

In particular embodiments, the computing system may further decompose the network or sub-networks, for example, by decomposing each of the one or more sites in the SCN into multiple sub-sites. For example, a given manufacturer could receive glass (a finished good) from another manufacturer in the SCN to manufacture display panels, which may then be used by the same manufacturer to manufacture smartphones, televisions, tablets, etc. In particular embodiments, one or more sites in the SCN or sub-network may have a constructed finished good network for the site. Using a finished good network for a particular site, the computing system may further decompose the particular site into multiple sub-site networks, which may represent the manufacture of a single finished good within a site. These sub-networks and sub-site networks can then be connected to the original supply chain network or sub-network to enable more efficient generation of path solutions. The computing system may use the one or more decomposed models, networks, sites, or sub-sites to determine one or more starting or ending nodes that may be used to generate one or more path solutions. For example, the decompositions may permit the computing system to better identify terminal sites in the supply chain network that may serve as a beginning or end of one or more generated path solutions.

In particular embodiments, the computing system may be programmed to determine if input data at step 105 includes flow data related to the supply chain network. Flow data (e.g., the movement of a sub-quantity of finished goods or raw materials across the SCN) may be present if, for example, existing finished goods or raw materials began transport between two sites prior to receiving the input data to fulfill a particular order of finished goods. As an example, returning to FIG. 2, a consumer may have previously ordered a quantity of 100 raw materials between vendor 250 and supplier 240. However, the transportation time between vendor 250 and supplier 240 is not instantaneous, and in some embodiments, the computing system may receive input data at step 105 after the quantity of raw materials has departed vendor 250 but prior to arriving at supplier 240. In this example, the in-transit quantity of raw materials is included as input flow data because it cannot be modified and must be accounted for when generating path solutions. In particular embodiments, the computing system may be programmed to generate one or more path solutions to fulfill the order based on the flow data. Each path solution may comprise an initial subset of the plurality of path fragments, such that particular flow data is included in certain path fragments.

In particular embodiments, the computing system may be programmed to execute loop detection instructions 140. A further problem often faced when modeling and optimizing supply chain networks is the presence of one or more loops in a supply chain network or path solution. A loop may comprise two or more path fragments that connect two sites in a circular or recursive manner, such that a first site is sending a raw material and/or a finished good to a second site, which then sends a raw material and/or a finished good back to the first site (e.g. detecting when the destination site of a finished good or raw material is a known source site). For example, returning to FIG. 2, a loop may occur if supplier 240 sends a raw material to MFG 230, who in turn uses the raw material to manufacture an "intermediate finished good" that is then returned along a return path fragment to the same supplier 240. In turn, the supplier may combine the "intermediate product" with one or more additional raw materials that are in turn, sent back to MFG 230. Loops create additional path fragments in the supply chain that must be accurately detected and evaluated. Without detecting and removing one or more loops, the output for one or more enumerated path solutions may be incorrect or may cause deadlock or errors in the processing of the model. In particular embodiments, loop detection instructions 140 may comprise loop detection 145, removing return lanes and flow rebalancing 150 in the supply chain network, generating one or more path solutions in an acyclic network at step 160A, tracing back and determining path flow calculations 170, and cost analysis and assignment 175. In particular embodiments, a loop may be removed by removing one or more path fragments that connect two or more sites of the plurality of sites in a recursive or circular manner.

Figure 4A:
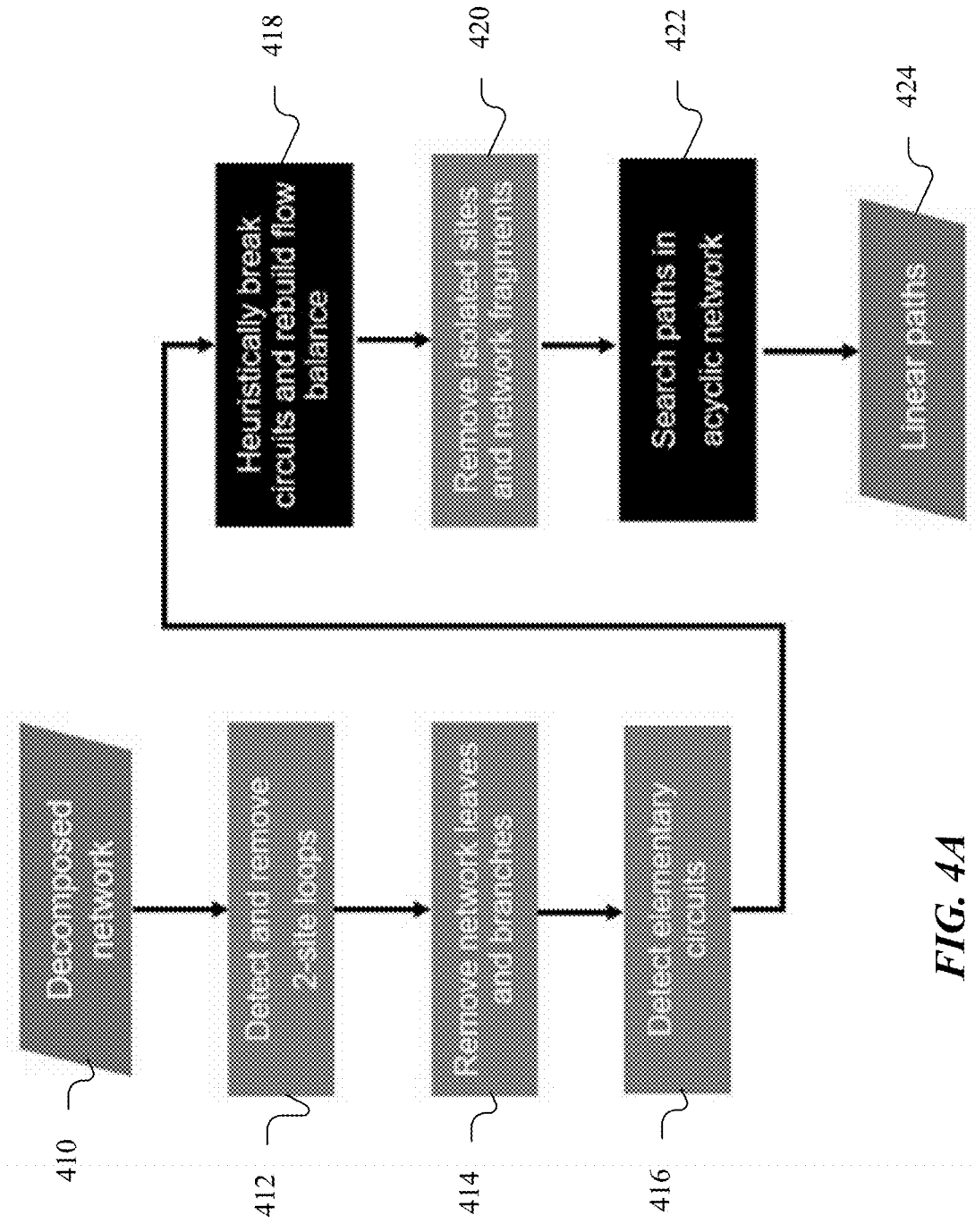
FIG. 4A illustrates a method for detecting and removing one or more loops in a cyclic network.

FIG. 4A illustrates a method for detecting and removing one or more loops in a cyclic network. Particular embodiments provide loop detection methods based on the characteristics or architecture of the supply chain network, for example, based on whether the supply chain network is cyclic or acyclic. The computing system may be programmed to receive the decomposed network 410 according to the methods described herein. At step 412, the computing system be programmed to detect and remove one or more two-site loops in the network. A two-site loop may comprise two or more path fragments that create a loop that includes only two sites in the SCN. In particular embodiments, two-site loops may be detected using a modified Morgan algorithm.

Figure 4B:
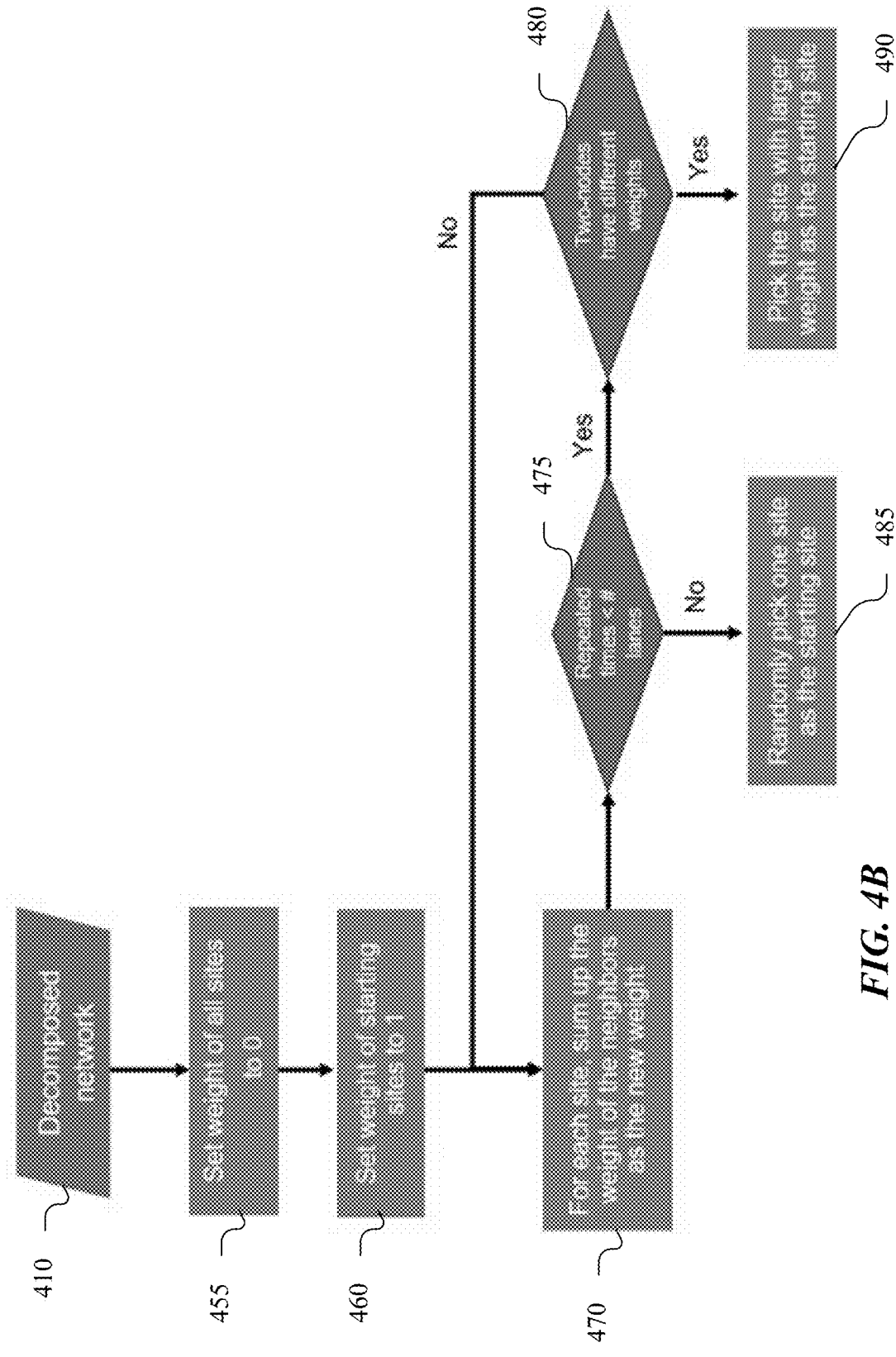
FIG. 4B illustrates a method for detecting and removing two-site loops in some embodiments.

FIG. 4B illustrates a method for detecting and removing two-site loops in some embodiments. The computing system may be programmed to receive the decomposed network 410 according to the methods described herein. Using this data, at step 455, each site in the decomposed network may be assigned a weight of 0. At step 460, the weight of the starting sites (e.g., the starting sites of the supply chain network) may be assigned a weight of 1. At step 470, the weight of each neighboring (e.g., adjacent) site may be summed up for each site. For example, returning to FIG. 2, vendor 250A, vendor 250B, and MFG 230A are designated as the starting sites, and their initial weight will be assigned to 1, while all other sites will be assigned 0 as their initial weight. In a first run, the weight of supplier 240 would be set to 2 by adding its weight, 0, and the weights of its neighbors (e.g., 1, 1, 0 for vendor 250A, vendor 250B, and MFG 230B, respectively). The weights of all the other sites will be updated in the same way. In a second run, the procedure will be repeated, such that the weight of supplier 240 would be set to 4 (e.g., by summing up 2, 1, 1, 0). At step 475, the computing system may be programmed to determine if the number of times this summation has been repeated is less than the number of lanes (e.g., path fragments) stemming from each site in the supply chain (e.g., MFG 230B as illustrated in FIG. 2 would have 2 path fragments). If the number of iterations of the summation exceeds the number of path fragments, the computing system may be programmed to determine at step 480 whether the two sites (e.g., nodes) have different weights after summation. If the number of iterations of the summation is less than the number of path fragments at step 485, the computing system may be programmed to randomly pick one site in the two-site loop as a starting site and randomly remove one or more return path fragments from the receiving site to remove the loop. If the computing system determines at step 480 that the two sites have different weights, the computing system may be programmed at step 490 to pick the site with the larger weight of the two sites in the two-site loop as the starting site and remove one or more return path fragments originating from the receiving site with the lowest weight to remove the two-site loop. If, at step 480, it is determined the two sites have identical weights, the computing system may return to step 470.

Particular embodiments may repeat one or more steps of the method of FIG. 4B, where appropriate. Although this disclosure describes and illustrates particular steps of the method of FIG. 4B as occurring in a particular order, this disclosure contemplates any suitable steps of the method of FIG. 4B occurring in any suitable order. Moreover, although this disclosure describes and illustrates an example method for detecting and removing two-site loops in some embodiments, including the particular steps of the method of FIG. 4B, this disclosure contemplates any suitable method for detecting and removing two-site loops in some embodiments, including any suitable steps, which may include all, some, or none of the steps of the method of FIG. 4B, where appropriate. Furthermore, although this disclosure describes and illustrates particular components, devices, or systems carrying out particular steps of the method of FIG. 4B, this disclosure contemplates any suitable combination of any suitable components, devices, or systems carrying out any suitable steps of the method of FIG. 4B.

Figure 5A:
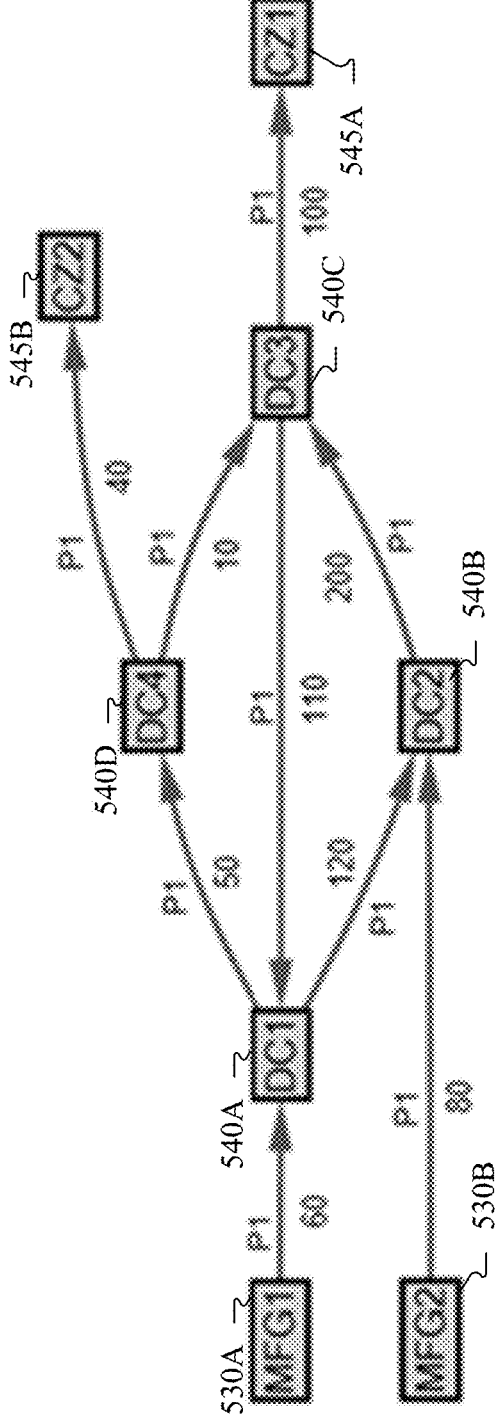
FIG. 5A illustrates a movement of finished goods between a section of a supply chain network with one or more loops.

Returning to FIG. 4A, Aa step 414, the computing system may be programmed to remove one or more network leaves and branches in the supply chain network. A leaf or branch may comprise one or more path fragments that form a terminal end of the SCN. FIG. 5A illustrates a movement of finished good between a section of a supply chain network with one or more loops. As illustrated in FIG. 5A, MFG 530A, MFG 530B, CZ 545A, and CZ 545B may all be considered a leaf or branch that may be temporarily removed at step 414 for the purpose of removing one or more loops. In particular embodiments, the computing system may have previously identified one or more sites that form a leaf or branch at step 130, as described herein.

Figure 5B:
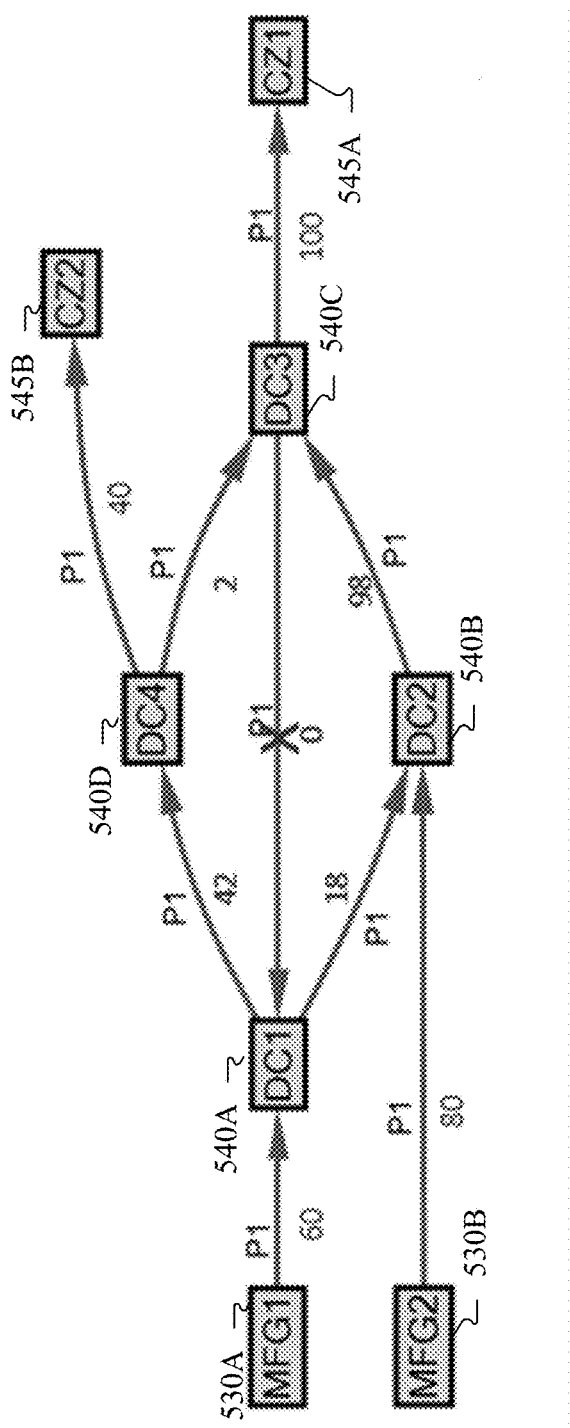
FIG. 5B illustrates the removal of a detected loop from a section of a supply chain network.

At step 416, the computing system may be programmed to detect and remove one or more elementary circuits in the supply chain network. An elementary circuit may comprise three or more sites that are recursively connected in a loop by path fragments. FIG. 5B illustrates the removal of a detected loop from a section of a supply chain network. As illustrated in FIG. 5B, DC 540A, DC 540B, DC 540C, and DC 540D may all form a loop based on a return path fragment between DC 540C and DC 540A. In particular embodiments, the computing system may use, for example, a Greedy algorithm or a Johnson algorithm to detect the one or more elementary circuits.

FIG. 6 illustrates an example pseudocode for an algorithm to detect one or more elementary circuits in a supply chain network. The variables and formulas in FIG. 6 may be defined as follows:

$A_K(\ )$ is an adjacency list of all vertices of the supply chain network;

B( ) is a list of marks to indicate a vertex is blocked so that it cannot be used twice on the same path or path solution;

$V_K$ is a list of all vertices;

blocked( ) is a function to set whether a vertex is blocked or not;

UNBLOCK( ) is a procedure to unblock vertices to search more circuits;

CIRCUIT( ) is a procedure to append a vertex to an elementary circuit;

f is a Boolean variable to indicate whether an elementary circuit is found or not;

s is the start vertex of an elementary circuit;

n is the total number of vertices;

v is a selected vertex;

u is a neighbor vertex of v; and w is any neighbor vertex of v.

In particular embodiments, the Johnson algorithm runs in $O((n+e)(c+1))$ time and uses $O(n+e)$ space plus the space used for the output, where O is a mathematical notation used to characterize the complexity of an algorithm according to its growth rates, n is the number of vertices in the architecture of the supply chain network, e is the number of edges in the supply chain network, and c is the number of elementary circuits in the supply chain network.

Returning to FIG. 4A, at step 418, the computing system may be programmed to break the one or more detected elementary circuits and adjust one or more path fragments to rebalance the flow of raw materials or finished goods in the SCN. If more than one elementary circuit is detected, the computing system may heuristically break the elementary circuits by grouping and ranking one or more path fragments in the supply chain network based on the number of elementary circuits that can be broken by removing a particular path fragment. As an example, returning to FIG. 5B, removing the path fragment defining a movement of a quantity of "110" of finished good P1 between DC 540C and DC 540A would remove two loops: a first loop between DC 540A, DC 540D, and DC 540C, and a second loop between DC 540A, DC 540B, and DC 540C. As illustrated in FIG. 5B, removing any other path fragment (e.g., the path fragment between DC 540A and DC 540D) would only remove one of these two loops. In particular embodiments, the computing system may also be programmed to require that the quantity of finished good or raw materials in the removed path fragment be less than the sum of the lowest flow quantity path fragments that define each of the loops to be removed. As illustrated in FIG. 5A, the lowest initial flow path fragment in the first loop (e.g., between DC 540A, DC 540D, and DC 540C) is the movement of 10 finished good P1 between DC 540D and DC 540C, and the lowest flow path in the second loop (e.g., between DC 540A, DC 540B, and DC 540C) is the movement of 120 finished good P1 between DC 540A and DC 540B. Because the sum of these two path fragments (e.g., 10+120=130) is larger than the quantity of goods in the path fragment between DC 540C and DC 540A (e.g., "110"), the path fragment between DC 540C and DC 540A can be removed. In particular embodiments, the computing system may be programmed to group and rank path fragments in the SCN by the quantity of finished goods or raw materials that are transported between two sites.

Upon removing a path fragment, the computing system may be programmed to identify a flow change and, if necessary, adjust the flow of one or more path fragments if one or more loops are removed from the supply chain network. FIG. 5B illustrates adjusting the flow of one or more path fragments if one or more loops are removed from the supply chain network. Upon removing the path fragment between DC 540A and DC 540C, the sub-quantities of finished good P1 that are transported between each site must be rebalanced for each path fragment that comprises the two loops that have been removed. In particular embodiments, the computing system may be programmed to first adjust the path fragments of the lowest flow quantity path fragments according to the equation:

$$\text{Flow}_{new}(PF_1) = \text{Flow}_{removed}\frac{\text{Flow}_{old}(PF_1)}{\sum_{n=1}^{\infty}\text{Flow}_{old}(PF_n)}$$

Where $\text{Flow}_{new}(PF_1)$ is the adjusted flow for a particular lowest flow quantity path fragment $PF_1$, $\text{Flow}_{removed}$ is the flow of the removed path fragment, and $\text{Flow}_{old}(PF_1)$ is the original flow for a particular lowest flow quantity path fragment $PF_1$, and $\text{Flow}_{old}(PF_n)$ is the original flow for a particular lowest flow quantity path fragment $PF_n$ for each loop impacted by removing a particular path fragment. Thus, as illustrated in FIG. 5B, the adjusted flow for the path fragment between DC 540D and DC 540C would be 110* (10/(10+120))=8.46 (e.g., 8) finished goods, and the adjusted flow for the path fragment between DC 540A and DC 540B would be 100*(120/(10+120))=101.54 (e.g., 102) finished goods. The computing system may then relocate and adjust the flow of the remaining path fragments (e.g., path fragment between DC 540A and DC 540D, and the path fragment between DC 540B and DC 540C) to rebalance the flow in the supply chain network. In particular embodiments, the computing system may be programmed to repeat these steps until the flow in the supply chain network is rebalanced for all removed loops.

At step 420, the computing system may be programmed to again remove one or more sites or path fragments that may have become isolated after removing one or more loops from the supply chain network.

At step 422, the computing system may be programmed to search and generate, based on the one or more path solutions and the one or more removed loops, one or more revised path solutions. Each revised path solution may comprise a revised subset of the plurality of path fragments by adjusting the sub-quantity of the one or more finished goods or the one or more raw materials associated with one or more path fragments of the initial subset of path fragments for each path solution in order to optimally fulfill an order for a particular quantity of one or more particular finished goods. A revised path solution may comprise a path along a supply chain network comprising a set of revised path fragments defining a movement of finished goods or raw materials between two sites in the supply chain network. In a particular revised path solution, each revised path fragment may define a movement of a sub-quantity of the finished good or the one or more raw materials between two sites. To generate a revised path solution for a particular set of input data, the computing system may search the input data after decomposing the network and removing one or more loops according to the methods disclosed herein. In particular embodiments, the computing system may be programmed to utilize a breadth-first searching method for determining path solutions by beginning at the starting sites in the supply chain network (e.g., the suppliers) and increasing the possible path solutions level by level until a full path is determined once the path has reached an ending site (e.g., a customer zone).

In particular embodiments, the path solutions may further account for other information comprising the input data, including for example and not by way of limitation, temporary price increases, shipping delays, or other external factors that are specific to particular sites (e.g., a natural disaster has temporarily limited the ability of a particular supplier in the supply chain to meet the demand of raw materials needed for this particular finished good). As another example, each of the revised path fragments may be associated with a time to move the sub-quantity of the one or more finished goods or the one or more raw materials between the two sites as defined by the particular path fragment. In particular embodiments, the computing system may pre-filter one or more paths or path fragments to account for this input information prior to generating full path solutions between a starting site and an ending site.

In particular embodiments, the computing system may be programmed to utilize a network optimization model to determine one or more revised path solutions that minimize one or more variables or criteria to optimally fulfill an order for a particular quantity of finished goods using the supply chain network. The network optimization model is a maximization model programmed according to an algorithm in which the product flows (denoted flow) between two directly related sites in the supply chain network are decision variables. The model is programmed to represent the operations of the supply chain network. The flow variables are selected to satisfy the business requirements and thus act as constraints on the model. The total landing cost and revenue of the supply chain network are calculated using these flow variables.

In an embodiment, the network optimization model executes using a maximization function; the general use of maximization functions in other domains and for other purposes is a well-understood aspect of statistical programming, and therefore this disclosure needs no detail on the structure or use of maximization functions as they are known to those of skill in the relevant arts. In an embodiment, an objective of the network optimization model is to determine the values of the flow variables so that the profit of the network is maximized. For example, a consumer may wish to fulfill a particular order while incurring the lowest costs, or achieving the highest revenue.

In particular embodiments, an additional constraint, relate_path fragment_and_flow may be added to the network optimization model to enforce that the total quantity of pathflow variables must be equal to the total quantity of flow variables called flow(s,d,p), where s is a source site, d is a destination site, and p is a finished good. Relate_path fragment_and_flow is a constraint to enforce that the total quantity of path fragment flow variables must be equal to the total quantity of flow variables called flow(s,d,p), for each source (s), destination (d) and product (p) combination, defined by the equation:

$$\text{related\_path fragment\_and\_flow} = \sum_{T,\Omega} pathflow = \sum_{T} \text{flow}(s, d, p)$$

where $\Omega$ is a set of all path fragments in PATHS(p) that contain the flow between s and d, and T is the set of all time periods in the model. In particular embodiments, the relate_path fragment_and_flow constraint may be updated to reflect the initial and the ending inventory of a particular source site or destination site. It should be appreciated that in some non-limiting embodiments, the network optimization model may output any number of revised path solutions and any number of revised path fragments comprising sub-quantities of finished goods and raw materials necessary to fulfill the order.

It should be further appreciated that while the figures disclosed represent simple supply chain networks, in some embodiments, a supply chain network may comprise hundreds or even thousands of sites, which may result in millions of path fragments and path solutions throughout the supply chain network to fulfill an order or demand for a particular finished good. As a result, for input data comprising orders to fulfill large quantities of finished goods (or multiple types of finished goods) in complex supply chain networks, thousands or even millions of possible path solutions exist to fulfill a particular order. As a result, in particular embodiments, the computing system may use a heuristic approach and only generate a finite number of revised path solutions necessary to find one or more path solutions based on the predetermined criteria. In particular embodiments, the computing system may dynamically release the memory of used or invalid path fragments during or after enumerating all possible paths along the supply chain network. For example, if a particular site is not capable of providing a particular raw material or manufacturing a finished good, one or more revised path fragments stemming from the site may be removed to reduce the number of possible paths in the supply chain network to fulfill the order.

Returning to FIG. 1B, if the computing system determines at step 130 that no flow data exists for the supply chain network, the computing system may be programmed to generate one or more path solutions for a general network.

In particular embodiments, without flow data, the computing system may be programmed to generate one or more linear path solutions. Each linear path solution may comprise a subset of the plurality of path fragments, with each path fragment comprising a linear path solution associated with a sub-quantity of finished goods or raw materials transported between two sites in order to optimally fulfill an order for a particular quantity of one or more particular finished goods, wherein each successive path fragment comprising the linear path solution proceeds downstream towards the ending site (e.g., from the supplier to the vendor, from the vendor to the manufacturer, etc.). Returning to FIG. 5A, a particular linear path solution may proceed from MFG 530A to DC 540A to DC 540D to DC 540C to CZ 545A. To generate a linear path solution for a particular set of input data, the computing system may be programmed to utilize a breadth-first searching method for determining path solutions by beginning at the starting sites in the supply chain network (e.g., the suppliers) and increasing the possible path solutions level-by-level until a full path is determined once the path has reached an ending site (e.g., a customer zone).

In particular embodiments, the computing system may pre-filter one or more paths or path fragments to account for this input information prior to generating full path solutions between a starting site and an ending site, as discussed herein with regard to path generation in an acyclic network to account for particular input data (e.g., temporary price increases, transportation time, shipping delays, or other external factors that are specific to particular sites). In particular embodiments, the computing system may be programmed to utilize a network optimization model according to the methods, models, and algorithms discussed herein with regard to an acyclic network.

To detect one or more loops in a supply chain network, the computing system may take a top-down approach, starting with the source sites at the beginning of the supply chain network (e.g., suppliers, vendors, etc.) and proceeding forward. The computing system will proceed forward from the starting sites and search downstream sites for any return path fragments that may comprise a loop. Upon determining a path fragment leads to an upstream site that has already been visited (e.g., DC 510), the computing system may mark the path fragment as a "return path fragment" and determine a loop is present for a particular site.

In particular embodiments, the computing system may be programmed to generate revised path solutions for a general network by adding one or more loops to the generated linear path solutions by recursively adding one or more path fragments to the generated linear path solutions for a general network. The computing system may identify one or more return lane path fragments in the supply chain network (e.g., a path fragment that moves from a downstream site to an upstream site or a path fragment that moves between two sites on the same level). The computing system may determine that one or more linear path solutions contain both sites that are connected by one or more return path fragments. The computing system may recursively insert these one or more return path fragments into the one or more linear path solutions that contain both sites that are connected by one or more return path fragments. In particular embodiments, the computing system may repeat these steps to generate revised path solutions until all possible return lanes are used in a revised path solution. By recursively adding loops to a general network, the computing system may identify additional combinations of path solutions that can be used to fulfill the order.

To illustrate recursively adding loops using FIG. 5A, the computing system may identify a return path fragment between DC 540C and DC540A. The computing system may determine one or more linear path solutions that contain both DC 540C and DC540A. For example, the linear path solution comprising MFG 530A to DC 540A to DC 540D to DC 540C to CZ 545A contains both sites; however, the linear path solution comprising MFG 530B to DC 540B to DC 540C to CZ 545A does not. For the linear path solution that contains both sites, the computing system may generate a revised or additional path solution by recursively inserting the return path fragment into the original path solution. The computing system may repeat this process to recursively add one or more return path fragments to the set of linear path solutions.

It should be further appreciated that in large or complex supply chain networks, the computing system may be programmed to employ a heuristic approach and only generate a finite number of path solutions necessary to find one or more path solutions based on the predetermined criteria. In particular embodiments, the computing system may dynamically release the memory of used or invalid path fragments during or after enumerating all possible paths along the supply chain network. For example, if a particular site is not capable of providing a particular raw material or manufacturing finished good, one or more path fragments stemming from the site may be removed to reduce the number of possible paths in the supply chain network to fulfill the order.

Returning to FIG. 1B, at step 185 the computing system may rank one or more path solutions or revised path solutions, which may comprise one or more revised path fragments. For example, if the consumer desires one or more path solutions that minimize the cost associated with the one or more path fragments comprising each enumerated path, the computing system may rank the revised path solutions based on the cost associated with each path. As another example, the consumer may desire the fastest fulfillment of the order regardless of cost, so the computing system may sum the time associated with the revised subset of path fragments comprising each of the path solutions and rank the revised path solutions based on the total time associated with fulfillment. In contrast, as another example, the consumer may desire the cheapest fulfillment of the order, regardless of time. The input data may comprise any number of defined criteria in order to prioritize the possible paths of the SCN, for example, and not by way of limitation, based on the total cost, the duty cost, the raw materials cost, the manufacturing cost, transportation costs, the time to fulfillment, the number of sites required, the location of sites required, or any other criteria that may be relevant to the decision of selecting a particular optimal path solution to fulfill an order for a quantity of finished goods. In particular embodiments, the computing system may rank one or more revised path solutions based on one or more defined criteria and the one or more path solutions of the network optimization model (e.g., from fastest fulfillment time to slowest, from cheapest fulfillment costs to most expensive, etc.).

In particular embodiments, at step 190, the computing system may be programmed to further filter and remove particular revised path solutions or path fragments in the supply chain network for a particular order based on one or more site constraints or predetermined criteria, for example, maximum or minimum materials or manufacturing costs, shipping times, current conditions (e.g., natural disasters that restrict operation, embargos, etc.) for the site. For example, if a particular quantity of finished goods must be received within 28 days, and the input data reflects the quickest raw materials may be shipped from a particular vendor to a particular supplier is 30 days, the computing system may remove all possible revised path solutions that utilize path fragments between these sites. As another example, if a particular distribution center is located in a country where there is a restriction or embargo on goods from a particular country or region (e.g., the United States has temporarily restricted or limited the quantity of products that can be imported from Mexico), the computing system may remove path solutions or path fragments that comprise sending finished goods from the particular country or region.

In particular embodiments, the computing system may be programmed to generate output 195, which comprises one or more revised path solutions that indicate the quantity of finished goods and raw materials that should be routed through each site in the supply chain network. The output may be suitable for display to a consumer of the model (e.g., a corporation that operates the SCN) on a client device (e.g., a mobile device, tablet, smartwatch, etc.). In some embodiments the one or more revised path solutions outputted to the user may be based on the defined filtering or ranking criteria. In some embodiments output may comprise a single top path solutions, comprising the optimal movement of raw materials and finished goods along the SCN to fulfill the order based on the defined filtering or ranking criteria. In some embodiments the output may comprise multiple revised path solutions, comprising multiple options for a path along the SCN that obtains an optimal or near-optimal fulfillment of the order based on the defined criteria. In other embodiments, the output may merely comprise one or more path fragments on the SCN, indicating a particular site or sites that should be utilized to fulfill the order but leaving the remaining decisions up to the consumer of the model. In particular embodiments, it may not be necessary to output every path or path fragment. In this situation, rather than find an optimal solution, the computing system may be programmed to take a heuristic approach, outputting enough paths to provide a near-optimal or serviceable solution. In particular embodiments, the output may comprise summary information for each path or path fragment. This information may include details regarding the quantity of finished goods/raw materials, method of shipment, specific taxes and duty costs incurred, and any other information relevant to the consumer's determination of which path to use to fulfill the order. In particular embodiments, the consumer may filter the one or more output paths or path fragments based on the consumer's needs.

In particular embodiments, the computing system may be programmed further to transmit to one or more computers associated with one or more sites in the supply chain network, a plurality of signals to initiate the movement of one or more of the raw materials or finished goods in the acyclic supply chain network along a particular revised path solution. The signals may further provide instructions necessary to complete the fulfillment of the order, including for example logistical details regarding the movement of finished goods or raw materials. In particular embodiments, the computing system may only transmit a plurality of signals to one or more computers associated with one or more sites that are considered to be the most critical in fulfilling the order based on the predetermined criteria. For example, if the consumer seeks to fulfill the order at the lowest cost, the computing system may transmit a plurality of signals associated with the most price-clastic sites. As another example, if the consumer seeks to fulfill the order in the quickest amount of time, the computing system may transmit a plurality of signals associated with the sites based on a time to move the sub-quantity of the one or more finished goods or the one or more raw materials between the two sites (e.g., initiate movement from the slowest sites as soon as possible to avoid any delays in fulfilling the order).

FIG. 7 illustrates an example method to generate one or more path solutions to fulfill an order for a quantity of finished goods through a supply chain network. In the example of FIG. 7, a method 700 may begin execution at step 710, where a computing system is programmed to receive input data comprising an order to provide a quantity of one or more finished goods to a site through an acyclic supply chain network, the one or more finished goods each comprising one or more raw materials.

At step 720, the computing system is programmed to access information that defines an architecture of the acyclic supply chain network comprising a plurality of sites connected by a plurality of path fragments, wherein a path fragment defines a movement of a sub-quantity of the one or more finished goods or the one or more raw materials between two sites of the plurality of sites.

At step 730, the computing system is programmed to generate one or more path solutions to fulfill the order, wherein each path solution comprises an initial subset of the plurality of path fragments.

At step 740, the computing system is programmed to remove one or more loops from the one or more path solutions, wherein removing the one or more loops comprises removing one or more path fragments that comprises the subset of path fragments for each path solution that connect two or more sites of the plurality of sites in a circular manner.

At step 750, the computing system is programmed to generate, based on the one or more path solutions and the one or more removed loops, one or more revised path solutions each comprising a revised subset of the plurality of path fragments by adjusting the sub-quantity of the one or more finished goods or the one or more raw materials associated with one or more path fragments of the initial subset of path fragments for each path solution.

At step 760, the computing system is programmed to output the one or more revised path solutions for display on a client device At step 770, the computing system is programmed to transmit, only to computers of the sites of the revised subset of the plurality of path fragments of a first path represented in the one or more revised path solutions, a plurality of signals to initiate the movement of one or more of the raw materials or finished goods in the acyclic supply chain network along the first path.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating one or more path solutions to fulfill an order for a quantity of finished goods through a supply chain network, including the particular steps of the method of FIG. 7, this disclosure contemplates any suitable method for generating one or more path solutions to fulfill an order for a quantity of finished goods through a supply chain network including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
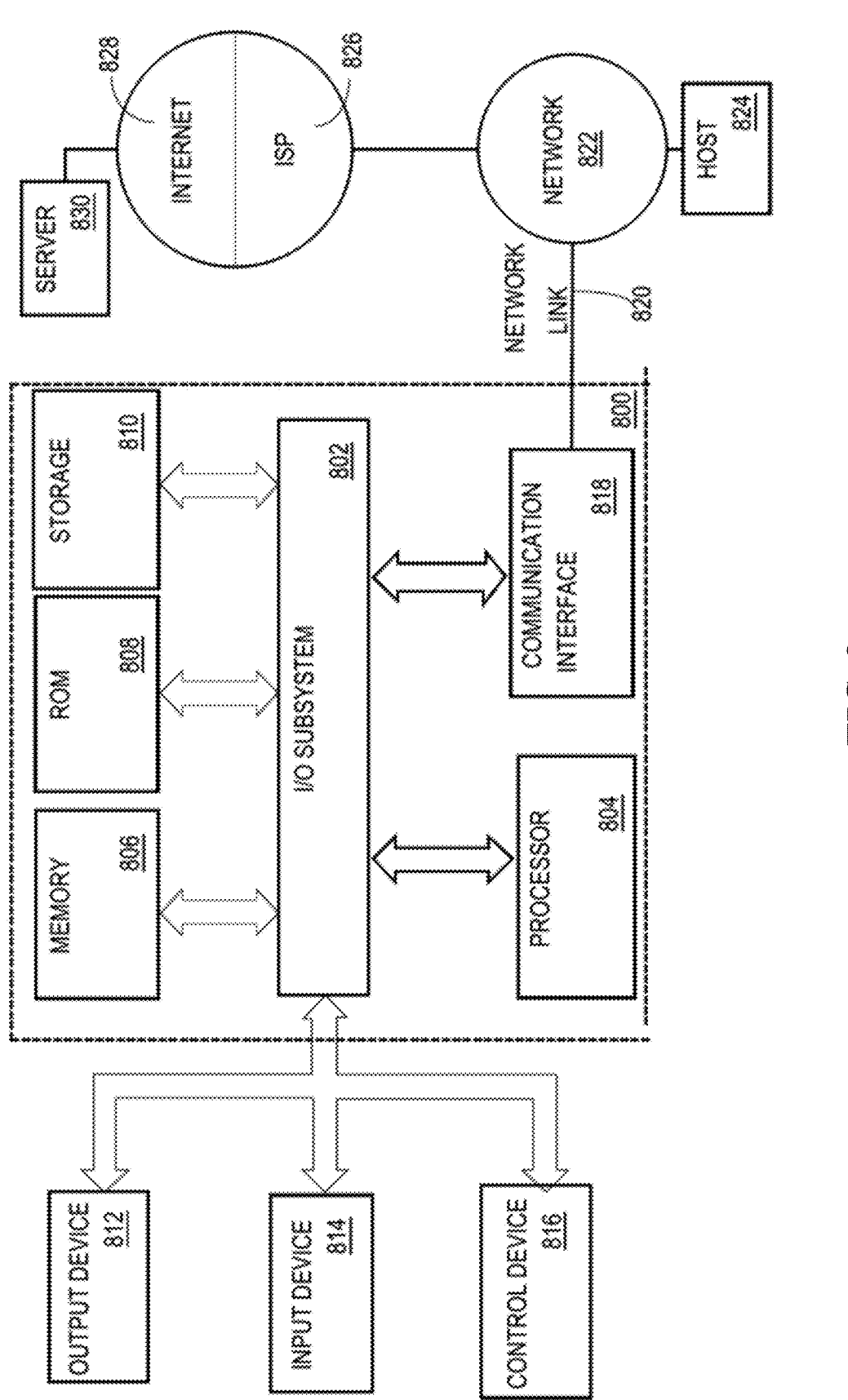
FIG. 8 is a block diagram that illustrates an example computer system with which an embodiment may be implemented.

FIG. 8 illustrates a block diagram that illustrates an example computer system with which an embodiment may be implemented. In the example of FIG. 8, a computer system 800 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 800 includes an input/output (I/O) subsystem 802, which may include a bus and/or other communication mechanism(s) for communicating information and/or instructions between the components of the computer system 800 over electronic signal paths. The I/O subsystem 802 may include an I/O controller, a memory controller, and at least one I/O port. The electronic signal paths are represented schematically in the drawings, for example, as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system, a graphics processing unit (GPU), a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read-only memory (ROM) 808 or other static storage devices coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, solid-state storage, magnetic disk, or optical disk such as CD-ROM or DVD-ROM and may be coupled to I/O subsystem 802 for storing information and instructions. Storage 810 is an example of a non-transitory computer-readable medium that may be used to store instructions and data which, when executed by the processor 804 cause performing computer-implemented methods to execute the techniques herein.

The instructions in memory 806, ROM 808, or storage 810 may comprise one or more sets of instructions that are organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer, such as a relational database system using structured query language (SQL) or no SQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touchscreen display, a light-emitting diode (LED) display, a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. The control device 816 may be a touchpad, a mouse, a trackball, or cursor direction keys for communicating direction information and command selections to processor 804 and for controlling cursor movement on an output device 812, such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an Internet of Things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host computer 824 or server computer 830.

Computer system 800 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infrared data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal, and appropriate circuitry can provide the data to I/O subsystem 802, such as placing the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to I/O subsystem 802. Communication interface 818 provides a two-way data communication coupling to network link(s) 820 that are directly or indirectly connected to at least one communication network, such as network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a worldwide packet data communication network represented as Internet 828. A server computer 830 may be coupled to Internet 828. Server computer 830 broadly represents any computer, data center, virtual machine, or virtual computing instance with or without a hypervisor or computer executing a containerized program system such as DOCKER or KUBERNETES. Server computer 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server computer 830 may form elements of a distributed computing system that includes other computers, a processing cluster, a server farm, or other organization of computers that cooperate to perform tasks or execute applications or services. Server computer 830 may comprise one or more sets of instructions that are organized as modules, methods, objects, functions, routines, or calls. The instructions may be organized into one or more computer programs, operating system services, or application programs, including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 830 may comprise a web application server that hosts a presentation layer, application layer and data storage layer, such as a relational database system using a structured query language (SQL) or no SQL, an object store, a graph database, a flat file system or other data storage.

Computer system 800 can send messages and receive data and instructions, including program code, through the network(s), network link 820 and communication interface 818. In the Internet example, a server computer 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

4. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims issued from this application in the specific form in which such claims issue, including any subsequent correction.

What is claimed is:

1. A computer-implemented method executed by a computing system, the computer-implemented method comprising:

receiving input data comprising an order to provide a quantity of one or more finished goods to a site through an acyclic supply chain network, the one or more finished goods each comprising one or more raw materials;

accessing information that defines an architecture of the acyclic supply chain network comprising a plurality of sites connected by a plurality of path fragments stored in computer memory of the computing system, wherein a path fragment defines a movement of a sub-quantity of the one or more finished goods or the one or more raw materials between two sites of the plurality of sites;

decomposing the acyclic supply chain network into one or more sub-networks and one or more sub-sites by extracting and generating one or more clusters of finished goods based on a raw material connection, wherein the raw material connection is based on a common raw material shared between two or more finished goods, and generating a sub-network for each of the one or more clusters of finished goods;

removing one or more invalid path fragments of the plurality of path fragments to reduce a number of possible paths in the acyclic supply chain network to fulfill the order and dynamically releasing the computer memory storing the one or more invalid path fragments;

assigning a first weight value to each site in the one or more sub-networks and the one or more sub-sites;

determining one or more starting sites from the one or more sub-networks and one or more sub-sites of the acyclic supply chain network after the decomposing, and assigning a second weight value to each of the one or more starting sites, wherein second weight values of the one or more starting sites are summed up to assign a third weight value for each neighboring site that is different from the one or more starting sites in each sub-site of the one or more sub-sites, wherein the second weight values of the one or more starting sites and the third weight value of each neighboring site are summed up iteratively;

determining whether iterations of summing up the second weight values of the one or more starting sites and the third weight value of each neighboring site are less than or exceeding number of path fragments;

in response to determining that the iterations are exceeding the number of path fragments, determining whether the one or more sub-sites have different weights after iterative summations;

in response to determining that the one or more sub-sites have different weights, selecting a sub-site with a larger weight value as a starting site and removing one or more path fragments originating from a receiving site with a lowest weight value to remove one or more loops;

removing one or more path fragments that comprises a subset of the plurality of path fragments for each path solution that connect two or more sites of the plurality of sites in a recursive or circular manner by removing the one or more loops exclusively between two sites of the plurality of sites, detecting one or more elementary circuits in one or more path solutions and removing the one or more elementary circuits by determining a quantity of elementary circuits associated with each path fragment of an initial subset of the one or more path fragments, and removing the one or more path fragments associated with a larger quantity of elementary circuits from the one or more path solutions;

releasing the computer memory associated with one or more revised path fragments corresponding to the one or more invalid path fragments, and the one or more loops;

generating, based on the one or more revised path fragments, one or more revised path solutions each comprising a revised subset of the plurality of path fragments by adjusting the sub-quantity of the one or more finished goods or the one or more raw materials associated with one or more path fragments of the initial subset of the plurality of path fragments;

outputting the one or more revised path solutions for display on a client device.

2. The computer-implemented method of claim 1, further comprising generating, based on the one or more sub-networks and the one or more sub-sites, the one or more path solutions to fulfill the order, wherein each path solution comprises the initial subset of the plurality of path fragments.

3. The computer-implemented method of claim 2, further comprising:

determining whether the input data comprises flow data related to the acyclic supply chain network by determining the one or more finished goods or the one or more raw materials began transporting between two sub-sites prior to receiving the input data to fulfill the order of the one or more finished goods, the flow data is associated with a movement of a sub-quantity of the one or more finished goods or the one or more raw materials across the acyclic supply chain network;

generating the one or more path solutions to fulfill the order based on the flow data, wherein each path solution comprises an initial subset of the plurality of path fragments associated with the flow data.

4. The computer-implemented method of claim 1, further comprising analyzing the one or more sub-networks by individualizing and associating the sub-network each of the one or more clusters of finished goods with a particular site of the plurality of sites in the acyclic supply chain network.

5. The computer-implemented method of claim 4, further comprising:

decomposing the particular site into multiple sub-site networks;

connecting the one or more sub-networks and the multiple sub-site networks to the acyclic supply chain network to generate the one or more path solutions.

6. The computer-implemented method of claim 1, each of the revised subset of the one or more path fragments being associated with a time to move the sub-quantity of the one or more finished goods or the one or more raw materials between two sub-sites.

7. The computer-implemented method of claim 5, further comprising ranking the one or more revised path solutions, wherein the one or more revised path solutions are ranked by summing time associated with the revised subset of the one or more path fragments comprising each of the one or more revised path solutions.

8. The computer-implemented method of claim 6, further comprising transmitting, only to computers of the sites of the revised subset of the plurality of path fragments of a first path represented in the one or more revised path solutions, a plurality of signals to initiate movement of one or more of the raw materials or finished goods in the acyclic supply chain network along the first path;

wherein the plurality of signals are transmitted to computers based on the time to move the sub-quantity of the one or more finished goods or the one or more raw materials between the two sub-sites.

9. The computer-implemented method of claim 1, further comprising:

in response to determining that the iterations are less than the number of path fragments, randomly selecting a starting site of the one or more sub-sites;

removing one or more path fragments from the receiving site to remove a loop of the one or more loops.

10. The computer-implemented method of claim 1, the acyclic supply chain network comprising thousands of sites and millions of path fragments.

11. One or more computer-readable non-transitory storage media storing one or more sequences of stored program instructions which, when executed using a computing system, cause the computing system to:

receive input data comprising an order to provide a quantity of one or more finished goods to a site through an acyclic supply chain network, the one or more finished goods each comprising one or more raw materials;

access information that defines an architecture of the acyclic supply chain network comprising a plurality of sites connected by a plurality of path fragments stored in computer memory of the computing system, wherein a path fragment defines a movement of a sub-quantity of the one or more finished goods or the one or more raw materials between two sites of the plurality of sites;

decompose the acyclic supply chain network into one or more sub-networks and one or more sub-sites by extracting and generating one or more clusters of finished goods based on a raw material connection, wherein the raw material connection is based on a common raw material shared between two or more finished goods, and generating a sub-network for each of the one or more clusters of finished goods;

remove one or more invalid path fragments of the plurality of path fragments to reduce the number of possible paths in the acyclic supply chain network to fulfill the order and dynamically release the computer memory storing the one or more invalid path fragments;

assign a first weight value to each site in the one or more sub-networks and the one or more sub-sites;

determine one or more starting sites from the one or more sub-networks and one or more sub-sites of the acyclic supply chain network after the decomposing, and assigning a second weight value to each of the one or more starting sites, wherein second weight values of the one or more starting sites are summed up to assign a third weight value for each neighboring site that is different from the one or more starting sites in each sub-site of the one or more sub-sites, wherein the second weight values of the one or more starting sites and the third weight value of each neighboring site are summed up iteratively;

determine whether iterations of summing up the second weight values of the one or more starting sites and the third weight value of each neighboring site are less than or exceeding number of path fragments;

in response to determining that the iterations are exceeding the number of path fragments, determine whether the one or more sub-sites have different weights after iterative summations;

in response to determining that the one or more sub-sites have different weights, select a sub-site with a larger weight value as a starting site and removing one or more path fragments originating from a receiving site with a lowest weight value to remove one or more loops;

remove one or more path fragments that comprises a subset of the plurality of path fragments for each path solution that connect two or more sites of the plurality of sites in a recursive or circular manner by removing the one or more loops exclusively between two sites of the plurality of sites, detecting one or more elementary circuits in one or more path solutions and removing the one or more elementary circuits by determining a quantity of elementary circuits associated with each path fragment of an initial subset of the one or more path fragments, and removing the one or more path fragments associated with a larger quantity of elementary circuits from the one or more path solutions;

release computer memory associated with one or more revised path fragments corresponding to the one or more invalid path fragments, and the one or more loops;

generate, based on the one or more revised path fragments, one or more revised path solutions each comprising a revised subset of the plurality of path fragments by adjusting the sub-quantity of the one or more finished goods or the one or more raw materials associated with one or more path fragments of the initial subset of the plurality of path fragments;

output the one or more revised path solutions for display on a client device.

12. The one or more computer-readable non-transitory storage media of claim 11, further comprising sequences of stored program instructions which, when executed using the computing system, are operable to generate, based on the one or more sub-networks and the one or more sub-sites, the one or more path solutions to fulfill the order, wherein each path solution comprises the initial subset of the plurality of path fragments.

13. The one or more computer-readable non-transitory storage media of claim 12, further comprising sequences of stored program instructions which, when executed using the computing system, are operable to:

determine whether the input data comprises flow data related to the acyclic supply chain network by determining the one or more finished goods or the one or more raw materials began transporting between the two sites prior to receiving the input data to fulfill the order of the one or more finished goods, the flow data is associated with a movement of a sub-quantity of the one or more finished goods or the one or more raw materials across the acyclic supply chain network; and generate the one or more path solutions to fulfill the order based on the flow data, wherein each path solution comprises an initial subset of the plurality of path fragments associated with the flow data.

14. The one or more computer-readable non-transitory storage media of claim 11, further comprising sequences of stored program instructions which, when executed using the computing system, are operable to analyze the one or more sub-networks by individualizing and associating the sub-network each of the one or more clusters of finished goods with a particular site of the plurality of sites in the acyclic supply chain network.

15. The one or more computer-readable non-transitory storage media of claim 14, further comprising sequences of stored program instructions which, when executed using the computing system, are operable to:

decompose a particular site into multiple sub-site networks; and connect the one or more sub-networks and the multiple sub-site networks to the acyclic supply chain network to generate the one or more path solutions.

16. The one or more computer-readable non-transitory storage media of claim 11, each of the revised subset of the one or more path fragments being associated with a time to move the sub-quantity of the one or more finished goods or the one or more raw materials between the two sites.

17. The one or more computer-readable non-transitory storage media of claim 15, further comprising sequences of stored program instructions which, when executed using the computing system, are operable to rank the one or more revised path solutions, wherein the one or more revised path solutions are ranked by summing time associated with the revised subset of the one or more path fragments comprising each of the one or more revised path solutions.

18. The one or more computer-readable non-transitory storage media of claim 16, further comprising sequences of stored program instructions which, when executed using the computing system, cause transmitting, only to computers of the sites of the revised subset of the plurality of path fragments of a first path represented in the one or more revised path solutions, a plurality of signals to initiate movement of one or more of the raw materials or finished goods in the acyclic supply chain network along the first path;

wherein the plurality of signals are transmitted to computers based on the time to move the sub-quantity of the one or more finished goods or the one or more raw materials between the two sites.

19. The one or more computer-readable non-transitory storage media of claim 11, further comprising sequences of stored program instructions which, when executed using the computing system, are operable to:

in response to determining that the iterations are less than the number of path fragments, randomly select a starting site of the one or more sub-sites; and remove one or more path fragments from the receiving site to remove a loop of the one or more loops.

20. The one or more computer-readable non-transitory storage media of claim 11, the acyclic supply chain network comprising thousands of sites and millions of path fragments.

21. One or more computer-readable non-transitory storage media storing one or more sequences of stored program instructions which, when executed using a computing system, cause the computing system to:

receive input data comprising an order to provide a quantity of one or more finished goods to a site through an acyclic supply chain network, the one or more finished goods each comprising one or more raw materials;

access information that defines an architecture of the acyclic supply chain network comprising a plurality of sites connected by a plurality of path fragments, wherein a path fragment defines a movement of a sub-quantity of the one or more finished goods or the one or more raw materials between two sites of the plurality of sites;

decompose the acyclic supply chain network into one or more sub-networks and one or more sub-sites by extracting and generating one or more clusters of finished goods based on a raw material connection, wherein the raw material connection is based on a common raw material shared between two or more finished goods, and generating a sub-network for each of the one or more clusters of finished goods;

remove one or more invalid path fragments of the plurality of path fragments, wherein an invalid path fragment is removed to reduce a number of possible paths in the acyclic supply chain network to fulfill the order;

assign a first weight value to each site in the one or more sub-networks and the one or more sub-sites;

determine one or more starting sites from the one or more sub-networks and one or more sub-sites of the acyclic supply chain network after the decomposing, and assigning a second weight value to each of the one or more starting sites, wherein second weight values of the one or more starting sites are summed up to assign a third weight value for each neighboring site that is different from the one or more starting sites in each sub-site of the one or more sub-sites, wherein the second weight values of the one or more starting sites and the third weight value of each neighboring site are summed up iteratively;

determine whether iterations of summing up the second weight values of the one or more starting sites and the third weight value of each neighboring site are less than or exceeding number of path fragments;

in response to determining that the iterations are exceeding the number of path fragments, determine whether the one or more sub-sites have different weights after iterative summations;

in response to determining that the one or more sub-sites have different weights, select a sub-site with a larger weight value as a starting site and removing one or more path fragments originating from a receiving site with a lowest weight value to remove one or more loops;

remove one or more path fragments that comprises a subset of the plurality of path fragments for each path solution that connect two or more sites of the plurality of sites in a recursive or circular manner by removing the one or more loops exclusively between two sites of the plurality of sites, detecting one or more elementary circuits in one or more path solutions and removing the one or more elementary circuits by determining a quantity of elementary circuits associated with each path fragment of an initial subset of the one or more path fragments, and removing the one or more path fragments associated with a larger quantity of elementary circuits from the one or more path solutions;

release computing memory associated with one or more revised path fragments corresponding to the one or more invalid path fragments and the one or more loops by the computing system executing one or more sets of program code corresponding to pseudocode as set forth in FIG. 6;

generate, based on the one or more revised path fragments, one or more revised path solutions each comprising a revised subset of the plurality of path fragments by adjusting the sub-quantity of the one or more finished goods or the one or more raw materials associated with one or more path fragments of the initial subset of the plurality of path fragments;

output the one or more revised path solutions for display on a client device.

22. The one or more computer-readable non-transitory storage media of claim 21, further comprising sequences of stored program instructions which, when executed using the computing system, are operable to generate, based on the one or more sub-networks and the one or more sub-sites, the one or more path solutions to fulfill the order, wherein each path solution comprises the initial subset of the plurality of path fragments.

23. The one or more computer-readable non-transitory storage media of claim 22, further comprising sequences of stored program instructions which, when executed using the computing system, are operable to:

determine whether the input data comprises flow data related to the acyclic supply chain network by determining the one or more finished goods or the one or more raw materials began transporting between the two sites prior to receiving the input data to fulfill the order of the one or more finished goods, the flow data is associated with a movement of a sub-quantity of the one or more finished goods or the one or more raw materials across the acyclic supply chain network; and generate the one or more path solutions to fulfill the order based on the flow data, wherein each path solution comprises an initial subset of the plurality of path fragments associated with the flow data.

24. The one or more computer-readable non-transitory storage media of claim 21, further comprising sequences of stored program instructions which, when executed using the computing system, are operable to analyze the one or more sub-networks by individualizing and associating the sub-network each of the one or more clusters of finished goods with a particular site of the plurality of sites in the acyclic supply chain network, decompose a particular site into multiple sub-site networks, and connect the one or more sub-networks and the multiple sub-site networks to the acyclic supply chain network to generate the one or more path solutions.

25. The one or more computer-readable non-transitory storage media of claim 21, further comprising sequences of stored program instructions which, when executed using the computing system, are operable to:

in response to determining that the iterations are less than the number of path fragments, randomly select a starting site of the one or more sub-sites; and remove one or more path fragments from the receiving site to remove a loop of the one or more loops.

* * * * *